United States Patent
Dupin et al.

(10) Patent No.: US 12,343,725 B2
(45) Date of Patent: Jul. 1, 2025

(54) METHOD FOR TRANSFERRING MATERIAL IN A MICROFLUIDIC OR MILLIFLUIDIC DEVICE

(71) Applicants: Paris Sciences et Lettres, Paris (FR); Centre National de la Recherche Scientifique (CNRS), Paris (FR); Ecole Superieure de Physique et de Chimie Industrielles de la Ville de Paris, Paris (FR)

(72) Inventors: Jean-Baptiste Dupin, Paris (FR); Ankur Shubhlal Chaurasia, Paris (FR); Jérôme Bibette, Paris (FR); Nicolas Bremond, Paris (FR); Jean Baudry, Paris (FR); Wilfried Sire, Paris (FR)

(73) Assignees: Centre National de la Recherche Scientifique (CNRS), Paris (FR); Ecole Superieure de Physique et de Chimie Industrielles de la Ville de Paris, Paris (FR); Paris Sciences et Lettres, Paris (FR)

(*) Notice: Subject to any disclaimer, the term of this patent is extended or adjusted under 35 U.S.C. 154(b) by 1042 days.

(21) Appl. No.: 17/252,167

(22) PCT Filed: Jun. 14, 2019

(86) PCT No.: PCT/EP2019/065744
§ 371 (c)(1),
(2) Date: Dec. 14, 2020

(87) PCT Pub. No.: WO2019/238947
PCT Pub. Date: Dec. 19, 2019

(65) Prior Publication Data
US 2021/0283612 A1   Sep. 16, 2021

(30) Foreign Application Priority Data
Jun. 14, 2018 (FR) ...................................... 1855240

(51) Int. Cl.
*B01L 3/00* (2006.01)

(52) U.S. Cl.
CPC . *B01L 3/502784* (2013.01); *B01L 2200/0673* (2013.01); *B01L 2300/0867* (2013.01); *B01L 2400/0487* (2013.01); *B01L 2400/06* (2013.01)

(58) Field of Classification Search
None
See application file for complete search history.

(56) References Cited

U.S. PATENT DOCUMENTS 5,480,614 A * 1/1996 Kamahori ........... B01L 3/50273
422/50
7,687,269 B2 * 3/2010 Kautz .................. G01R 33/307
422/68.1

(Continued)

FOREIGN PATENT DOCUMENTS

EP   1306674 A1   5/2003

OTHER PUBLICATIONS

Jul. 10, 2019—(WO) International Search Report—App. No. PCT/EP2019/065744.

(Continued)

*Primary Examiner* — Brian R Gordon
(74) *Attorney, Agent, or Firm* — Banner & Witcoff, Ltd.

(57) ABSTRACT

The present invention relates to a method for transferring material in a microfluidic or millifluidic device between a droplet of a first droplet train and a droplet of a second droplet train, as well as to the use of this method for the preparation of biological or chemical samples, the implementation of biological or chemical reactions, the screening of a molecule of synthetic or biological origin, or the (Continued)

screening or cultivation of microorganisms. The present invention also relates to a microfluidic or millifluidic device suitable for carrying out the method according to the invention.

23 Claims, 13 Drawing Sheets

(56) References Cited

U.S. PATENT DOCUMENTS

| | | | | |
|---|---|---|---|---|
| 7,704,457 | B2* | 4/2010 | Patton | B01F 25/4331 422/82.07 |
| 9,194,861 | B2* | 11/2015 | Hindson | B01L 7/525 |
| 2002/0037499 | A1* | 3/2002 | Quake | B01L 3/502753 435/6.19 |
| 2003/0209059 | A1* | 11/2003 | Kawano | B01L 3/502761 73/53.01 |
| 2005/0272159 | A1* | 12/2005 | Ismagilov | B01L 3/502746 436/34 |
| 2007/0116601 | A1* | 5/2007 | Patton | B01F 25/4331 422/81 |
| 2008/0166793 | A1* | 7/2008 | Beer | C12Q 1/04 435/287.2 |
| 2009/0035770 | A1* | 2/2009 | Mathies | G01N 27/44743 204/453 |
| 2009/0126516 | A1* | 5/2009 | Yamamoto | B01F 33/3021 73/864.22 |
| 2009/0181864 | A1* | 7/2009 | Nguyen | B01L 3/502792 204/601 |
| 2009/0235990 | A1* | 9/2009 | Beer | G05D 7/0694 137/3 |
| 2010/0285975 | A1* | 11/2010 | Mathies | B01F 33/3011 506/7 |
| 2011/0112503 | A1 | 5/2011 | Ismagilov et al. | |
| 2011/0151578 | A1* | 6/2011 | Abate | B01L 3/502746 436/180 |
| 2011/0311978 | A1* | 12/2011 | Makarewicz, Jr. | B01L 3/502784 435/6.12 |
| 2012/0219947 | A1* | 8/2012 | Yurkovetsky | B01F 25/14 435/6.11 |
| 2014/0024023 | A1* | 1/2014 | Cauley, III | B01F 33/3011 435/6.1 |
| 2014/0200164 | A1* | 7/2014 | Makarewicz, Jr. | B01L 3/52 506/40 |
| 2014/0221239 | A1* | 8/2014 | Carman | B01L 3/502784 435/6.12 |
| 2015/0041396 | A1* | 2/2015 | Kelly | B01L 3/502784 210/198.2 |
| 2015/0065396 | A1* | 3/2015 | Kiani | C12N 15/1075 435/6.12 |
| 2015/0125363 | A1* | 5/2015 | Schlaudraff | B01L 3/502715 422/507 |
| 2015/0209785 | A1* | 7/2015 | Esmail | B01L 7/525 435/6.12 |
| 2016/0045914 | A1* | 2/2016 | Abate | B01F 33/3031 137/154 |
| 2016/0129443 | A1* | 5/2016 | Tovar | G01N 15/1484 506/40 |
| 2016/0303564 | A1* | 10/2016 | Gilbert | B01L 3/502746 |
| 2017/0128942 | A1* | 5/2017 | Abate | B01L 3/5027 |
| 2017/0189908 | A1* | 7/2017 | Dzenitis | B01L 3/0241 |
| 2017/0216844 | A1* | 8/2017 | Garnica Rodriguez | B01L 3/50273 |
| 2018/0133715 | A1* | 5/2018 | Craig | G01N 15/1492 |
| 2018/0321130 | A1* | 11/2018 | Wu | B01L 3/502761 |
| 2018/0334670 | A1* | 11/2018 | Bharadwaj | C12N 15/1075 |
| 2018/0355407 | A1* | 12/2018 | Utharala | C12Q 1/6806 |
| 2019/0002956 | A1* | 1/2019 | Stumbo | C12Q 1/6846 |
| 2020/0360929 | A1* | 11/2020 | Guzman | C12M 23/16 |
| 2021/0107004 | A1* | 4/2021 | Cayer | C40B 40/06 |
| 2021/0283612 | A1* | 9/2021 | Dupin | B01L 3/502784 |
| 2022/0008928 | A1* | 1/2022 | Colston, Jr. | G01N 21/3577 |
| 2022/0410162 | A1* | 12/2022 | Bharadwaj | C12Q 1/6806 |
| 2023/0372935 | A1* | 11/2023 | Hiddessen | C12Q 1/686 |

OTHER PUBLICATIONS

Xu et al., "Fusion and sorting of two parallel trains of droplets using a railroad-like channel network and guiding tracks," Lab on a Chip, vol. 12, No. 20, p. 3936-3942 (Jun. 14, 2016).

Chen et al., "A microfluidic chip integrated with droplet generation, pairing, trapping, merging, mixing and releasing," RSC Advances, vol. 7, No. 27, pp. 16738-16750 (Mar. 16, 2017).

Lin et al., "On-demand liquid-in-liquid droplet metering and fusion utilizing pneumatically actuated membrane valves," Journal of Micromechanics & Microengineering, vol. 18, No. 11, Sec. 115005 (Sep. 23, 2008).

Au et al. Microvalves and Micropumps for BioMEMS. Micromachines 2011, 2, 179-220.

* cited by examiner

A

B

METHOD FOR TRANSFERRING MATERIAL IN A MICROFLUIDIC OR MILLIFLUIDIC DEVICE

CROSS-REFERENCE TO RELATED APPLICATIONS

This application is a U.S. National Stage application under 35 U.S.C. § 371 of International Application PCT/EP2019/065744, filed Jun. 14, 2019, which claims the benefit of priority to French Application No. 1855240, filed Jun. 14, 2018. Benefit of the filing date of each of these prior applications is hereby claimed. Each of these prior applications is hereby incorporated by reference in its entirety.

TECHNICAL FIELD

The present invention relates to a method for transferring material, in a microfluidic or millifluidic device, between a droplet of a first droplet train and a droplet of a second droplet train, and to the use of this method for the preparation of biological or chemical samples, the carrying out of biological or chemical reactions, the screening of molecules of synthetic or biological origin, or the screening or culture of microorganisms.
The present invention also relates to a microfluidic or millifluidic device capable of implementing the method according to the invention.

PRIOR ART

The preparation of biological or chemical samples, whether in large or small biological or chemical reactors (round-bottom flasks, Falcon tubes, 96-well plates, droplet trains, etc.), requires the use of intermediate containers for dosing or pipetting. In the case of technologies adapted to biology, and therefore with a high number of replicas (multi-well plates, millifluidic droplet trains), it is necessary to use a multi-well plate and pipetting systems, and in most cases an experimenter.
The only existing solution for handling a large number of samples, analyzing them, modifying the composition of the reactors, in particular from a previous diluted reactor, all automatically and while controlling the experimental conditions, is rather inelegant. In the case of multiparallel cultures, a multi-well plate reader is coupled to a plate-handling robot pipettor, all of which remains in a thermalized and sterile chamber. It is therefore always an expensive custom set-up using a lot of consumables. Indeed, if the number of handleable reactors is substantial, up to several tens of 384-well plates (~10 000 reactors) and they can be diluted very quickly (proportional to the number of plates and not to the number of reactors), it will nevertheless be necessary to consume a number of plates and tips in proportion: for 1000 chemostats of 100 µL each, in the case of a dilution by 1000 at each step, one experiment on 1000 bacterial generations (3 weeks) represents 10 L of culture medium, 300 plates and 100 000 tips of consumables.
Similarly, some microfluidic devices may allow the study of a very large number of reactors over a large number of generations, but they are always custom-made, for a very specific application, do not lend themselves well to a large variability in the chemical composition of the droplets and are difficult to handle independently of the droplets. To our knowledge, only two microfluidic technologies allow easily droplet handling, and both require electro-activatable paving, i.e., a highly complex system: they are electrowetting microfluidics and microfluidic joystick technology.
Moreover, in the case of Millidrop millifluidic technology, it is necessary to manufacture a new droplet train, at each step, by drawing up the droplets into a 96-well plate, then, after incubation, removing the droplets one by one into a 96-well plate. These operations take time, subject the droplets to different temperature, pressure, aeration and mixing conditions, unlike the incubation phase, have a high risk of contamination external to the instrument, are insufficiently robust (inhomogeneity of the droplets generated, errors in the removal of the droplets, extreme dependence on the external temperature) and require an experimenter. This technology, however powerful it may be to incubate a large number of reactors and analyze them, is therefore still limited by multi-well plate technology in terms of diversity (composition) of the droplets at generation and at removal (diversity preserved).
In the case of an experiment consisting in the propagation of bacterial lines, millifluidic technology thus makes it possible to propagate the same number of lines as in a multi-well plate experiment, but the time separating two incubation phases is longer. In both cases, the conditions of this transmission step are poorly controlled, and its duration is not negligible compared with the duration of an incubation. It therefore seems difficult to maintain, for example, a bacterial population in exponential growth phase, all conditions constant (chemostat), over a significant number of generations (several thousand) and over a large number of reactors in parallel.
Therefore, current technologies for the preparation of biological or chemical samples present the following difficulties:
the difficulty of generating a large number of reactors that are very different in composition (management of reactor diversity);
the difficulty of continuously diluting and handling a large number of reactors while controlling the experimental conditions (maintaining the continuity of the experiment) and avoiding any external contamination;
the difficulty of automation, an experimenter generally being needed;
difficulties in terms of time, cost and number of consumables needed to carry out these steps.
There is thus a need for a new method for the preparation of biological and chemical samples to overcome these difficulties.
The method according to the present invention thus makes it possible to transfer, without any other intermediary, a volume of material taken from a selected droplet in a droplet train to another selected droplet in a droplet train. This operation being carried out within the fluid system, the droplets are not subjected to unwanted conditions and cannot be contaminated from the outside. No consumables are used during this operation. Furthermore, a given reactor does not have to wait until all the new reactors are completed to be effective.

SUMMARY OF THE INVENTION

The present invention thus relates to a method for transferring material between two droplets in a microfluidic or millifluidic, preferably millifluidic, device comprising:
a first microfluidic or millifluidic channel and a second microfluidic or millifluidic channel,
a transfer channel connecting the first channel to the second channel, and a closing and opening system to control the opening and closing of the transfer channel and which includes an open and a closed position, said method comprising the following steps:
(a) put the closing and opening system of the transfer channel in a closed position if it is in an open position;
(b) generate, in the first microfluidic or millifluidic channel, a first droplet train comprising a continuous phase, at least two droplets and optionally at least one spacer between two successive droplets $A_n$ and $A_{n+1}$ where $n \geq 1$;
(c) generate, in the second microfluidic or millifluidic channel, a second droplet train comprising a continuous phase, at least two droplets and optionally at least one spacer between two successive droplets $B_m$ and $B_{m+1}$ where $m \geq 1$;
(d) position a droplet $A_n$ of the first droplet train in front of the junction between the transfer channel and the first channel;
(e) position a droplet $B_m$ of the second droplet train in front of the junction between the transfer channel and the second channel;
(f) put the closing and opening system of the transfer channel in an open position so as to allow:
the transfer of at least a part of the droplet $A_n$ of the first droplet train to the droplet $B_m$ of the second droplet train, or
the transfer of at least a part of the droplet $B_m$ of the second droplet train to the droplet $A_n$ of the first droplet train,
before putting the closing and opening system of the transfer channel back in the closed position;
(g) optionally repeat steps (d) to (f) one or more times with the same droplet $A_n$ or a different droplet of the first droplet train and with the same droplet $B_m$ or a different droplet of the second droplet train.

According to a first embodiment (A1), step (f) is implemented after steps (d) and (e) so that the closing and opening system of the transfer channel is placed in an open position once the droplets $A_n$ and $B_m$ are positioned respectively at each end of the transfer channel. In this embodiment, the closing and opening system in an open position allows the passage of material directly between the droplets $A_n$ and $B_m$ via the transfer channel. Steps (a) to (g) can thus be carried out successively.

In a second embodiment (A2), the transfer channel comprises a second closing and opening system, the first closing and opening system being closer to the connection of the transfer channel to the first microfluidic or millifluidic channel than the second closing and opening system. Conversely, the second closing and opening system is closer to the connection of the transfer channel to the second microfluidic or millifluidic channel than the first closing and opening system. In this embodiment, both closing and opening systems are in a closed position in step (a) and step (f) comprises the following successive sub-steps:
(f1) put the first closing and opening system of the transfer channel in an open position so as to allow the transfer of at least a part of the droplet $A_n$ of the first droplet train to the transfer channel, then put the first closing and opening system of the transfer channel back in a closed position;
(f2) put the second closing and opening system of the transfer channel in an open position so as to allow the transfer of the material from the droplet $A_n$ of the first droplet train that is present in the transfer channel to the droplet $B_m$ of the second droplet train, then put the second closing and opening system back of the transfer channel in a closed position.

These steps (f1) and (f2) allow the transfer of at least a part of the droplet $A_n$ of the first droplet train to the droplet $B_m$ of the second droplet train.

Step (f) may also comprise the following successive sub-steps:
(f'1) put the second closing and opening system of the transfer channel in an open position so as to allow the transfer of at least a part of the droplet $B_m$ of the second droplet train to the transfer channel, then put the second closing and opening system of the transfer channel back in a closed position;
(f'2) put the first closing and opening system of the transfer channel in an open position so as to allow the transfer of the material from the droplet $B_m$ of the second droplet train that is present in the transfer channel to the droplet $A_n$ of the first droplet train, then put the first closing and opening system of the transfer channel back in a closed position.

These steps (f'1) and (f'2) allow the transfer of at least part of the droplet $B_m$ of the second droplet train to the droplet $A_n$ of the first droplet train.

Steps (f1) and (f'2) are implemented after step (d). Steps (f2) and (f'1) are implemented after step (e).

According to a third embodiment (A3), the closing and opening system of the transfer channel comprises a second open position. Thus, it comprises:
a closed position that prevents any passage of material into the transfer channel on either side of the closing and opening system;
a first open position which allows the transfer of material from the first microfluidic or millifluidic channel to the transfer channel or, conversely, from the transfer channel to the first microfluidic or millifluidic channel;
a second open position which allows the transfer of material from the second microfluidic or millifluidic channel to the transfer channel or, conversely, from the transfer channel to the second microfluidic or millifluidic channel The embodiment (A3) is therefore similar to the embodiment (A2) with a single valve, the first open position playing the role of the first closing and opening system of (A2) and the second open position playing the role of the second closing and opening system of (A2).

The method according to the invention may further comprise the following additional steps:
(h) remove the first droplet train from the first microfluidic or millifluidic channel or the second droplet train from the second microfluidic or millifluidic channel;
(i) generate, in the microfluidic or millifluidic channel freed in step (h), a third droplet train comprising a continuous phase, at least two droplets and optionally at least one spacer between two successive droplets $C_p$ and $C_{p+1}$ where $p \geq 1$;
(j) implement steps (d) to (g), the third droplet train replacing the first droplet train or the second droplet train removed in step (h);
(k) optionally repeat steps (h) to (j) one or more times.

The present invention also relates to the use of the method according to the invention for the preparation of biological or chemical samples, the carrying out of biological or chemical reactions, the screening of molecules of synthetic or biological origin, or the screening or culture of microorganisms, e.g. bacteria.

Finally, the present invention relates to a microfluidic or millifluidic, preferably millifluidic, device which can be used to implement the method according to the invention, comprising:
- a first microfluidic or millifluidic channel comprising an inlet E1 and an outlet S1;
- a second microfluidic or millifluidic channel comprising an inlet E2 and an outlet S2;
- a transfer channel connecting the first microfluidic or millifluidic channel to the second microfluidic or millifluidic channel;
- a closing and opening system to control the opening and closing of the transfer channel;
- a droplet train generation system connected to both the inlet E1 of the first channel and the inlet E2 of the second channel or two droplet train generation systems connected to the inlet E1 of the first channel and the inlet E2 of the second channel respectively;
- a system for controlling pressure in the first microfluidic or millifluidic channel and in the second microfluidic or millifluidic channel.

FIGURES

FIG. 1 schematically represents a part of the microfluidic or millifluidic device according to the invention, namely a portion of the first channel comprising a mother droplet, a portion of the second channel comprising a daughter droplet, the transfer channel and the closing and opening system of said transfer channel of the pneumatic pinch valve type. The device is shown before (A), during (B) and after (C) a transfer of material from the mother droplet to the daughter droplet. FIG. 1 shows an example embodiment of the method according to the invention, according to the embodiment (A1).

FIG. 2 schematically represents a microfluidic or millifluidic device according to the invention comprising a first channel and a second channel connected by a transfer channel, a closing and opening system of said transfer channel in a closed position (represented by a cross), two droplet train generation systems with an "X" junction, four continuous phase reservoirs (Oil res.) and a collecting vessel (not shown). This device comprises a first droplet train and a second droplet train in the process of formation.

Figure 4A:
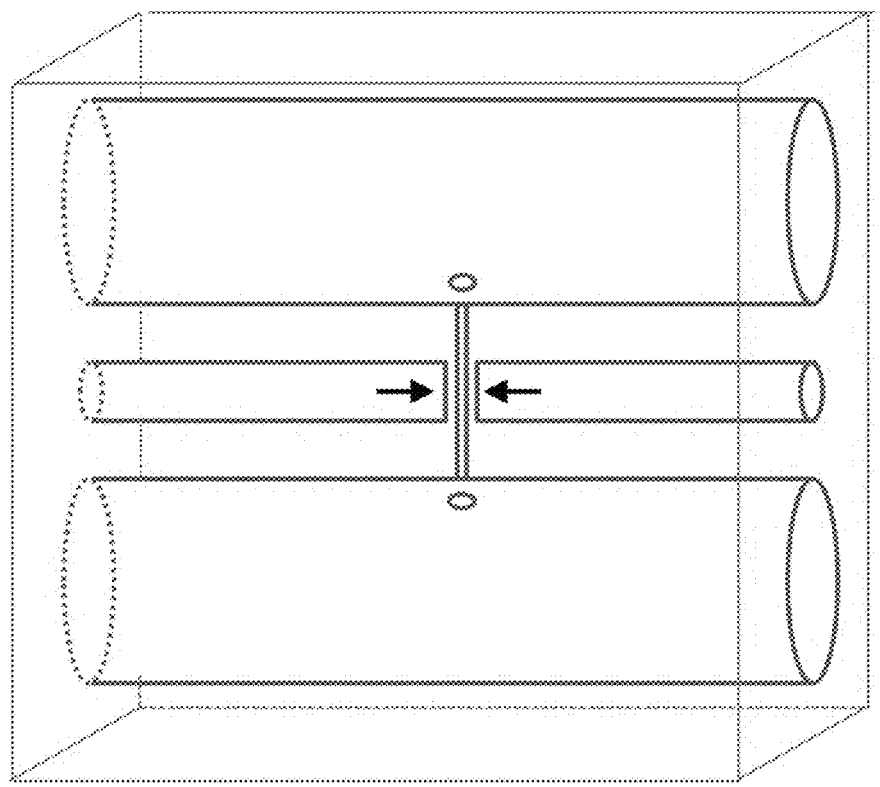

FIG. 4A schematically represents a transfer block according to example 1 that can be used in the embodiment (A1) and comprising a transfer channel, two cavities passing through the block to accommodate the first and second microfluidic channels and two cavities on either side of the transfer channel intended to allow it to be closed by applying pressure.

Figure 4B:
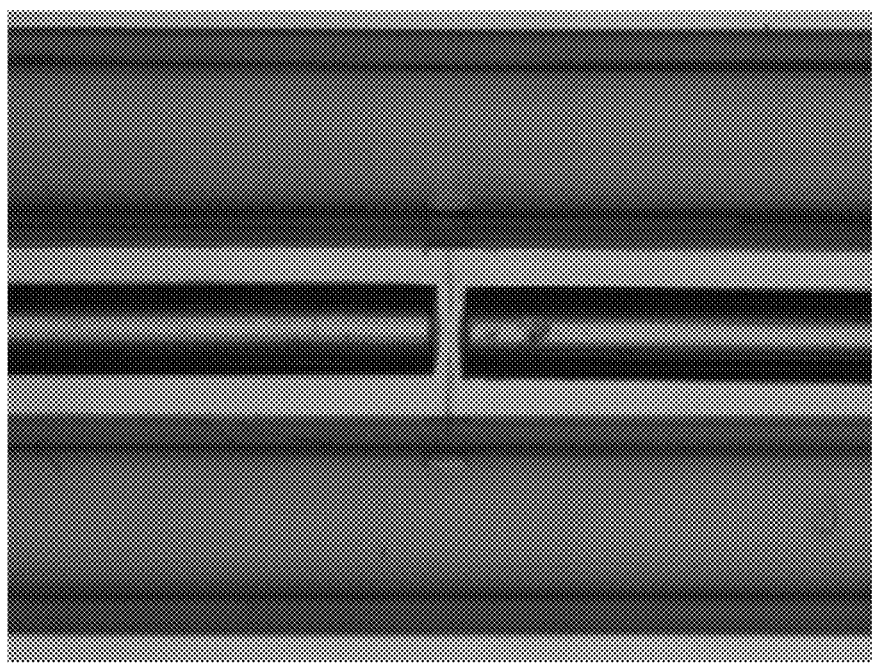

FIG. 4B is a photograph of the transfer block schematized in FIG. 4A.

Figure 5A:
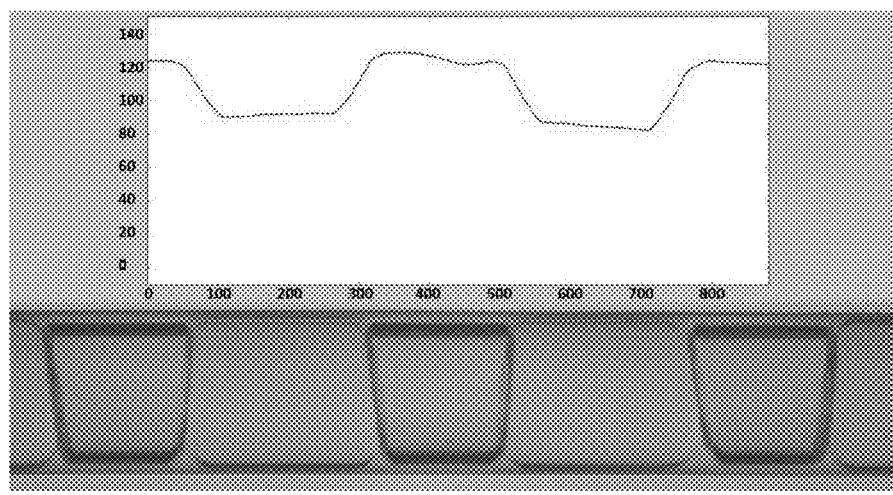
Figure 5B:
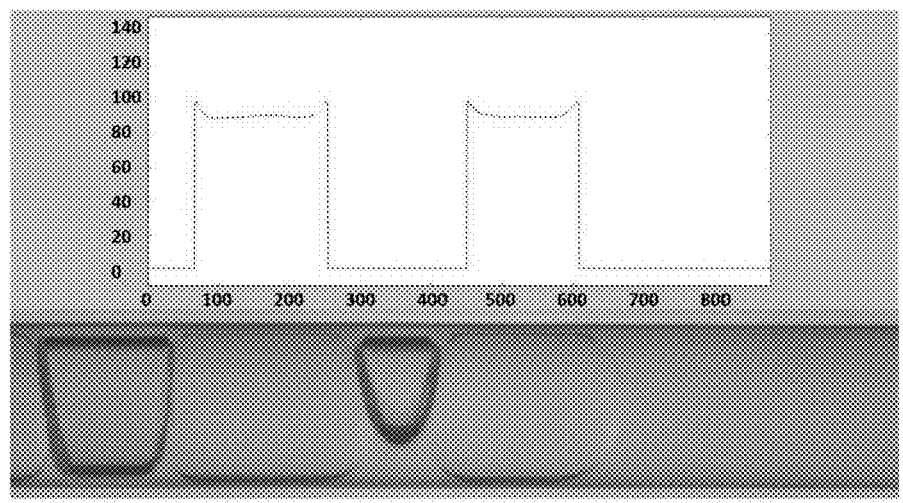
Figure 5C:
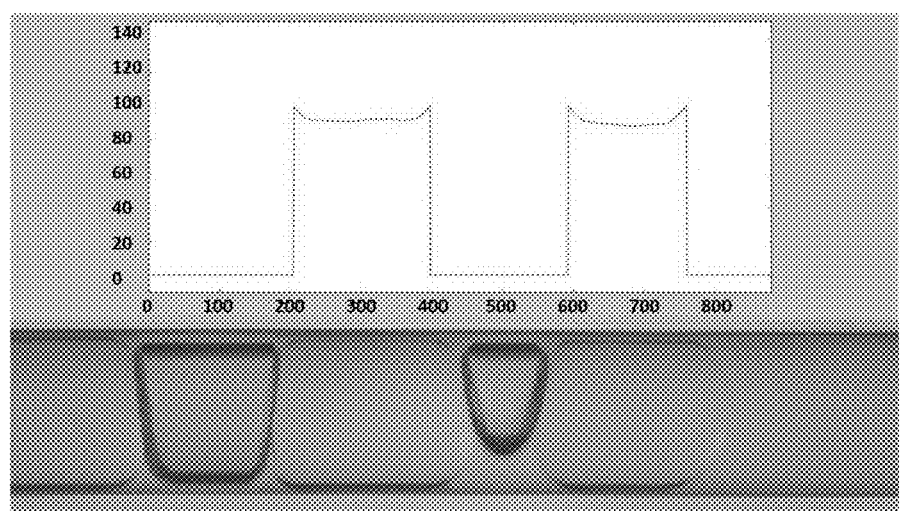

FIGS. 5A to 5C illustrate the method of droplet identification by detection line.

Figure 6:
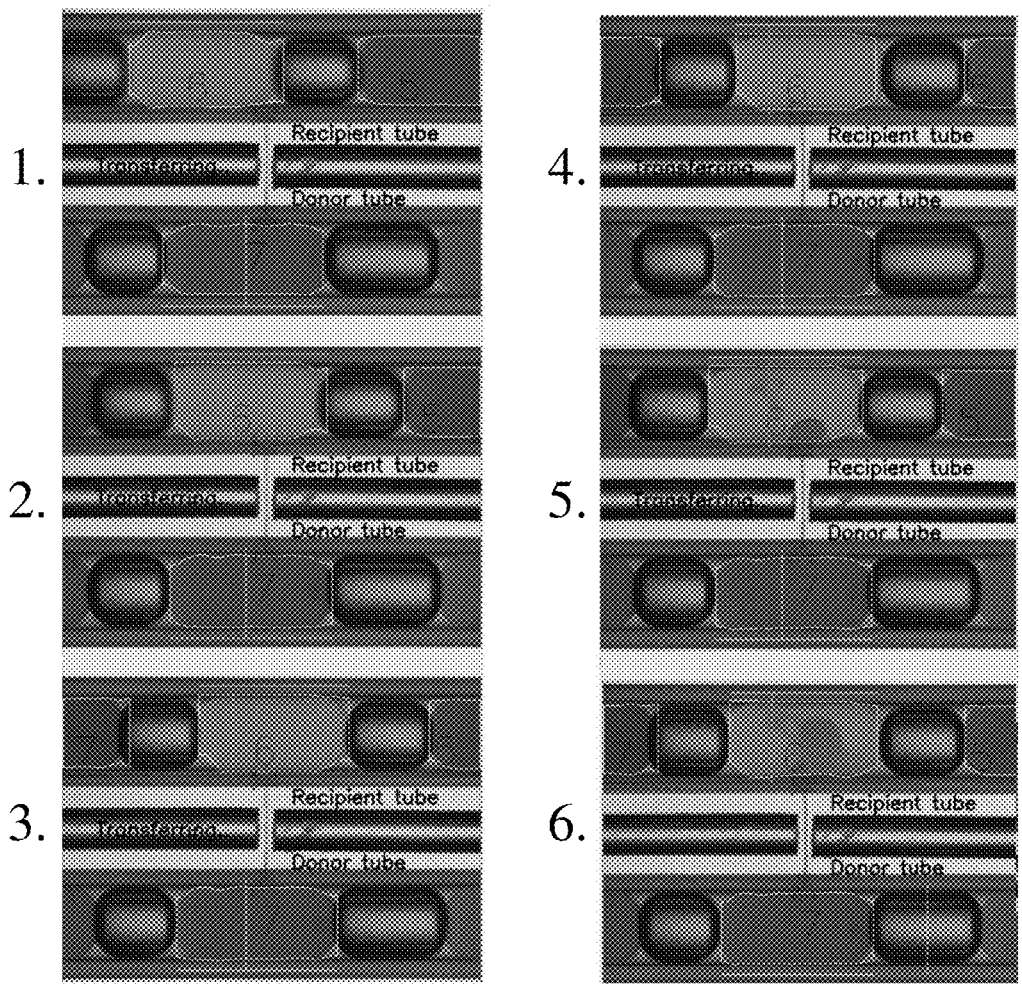

FIG. 6 presents six chronological photographs of the area of the device around the transfer channel representing different phases of material transfer from a donor droplet (droplet no. 7 of the lower tube—"donor tube") to a recipient droplet (droplet no. 6 of the upper tube—"recipient tube"), the droplets being identified by shape recognition.

Figure 7:
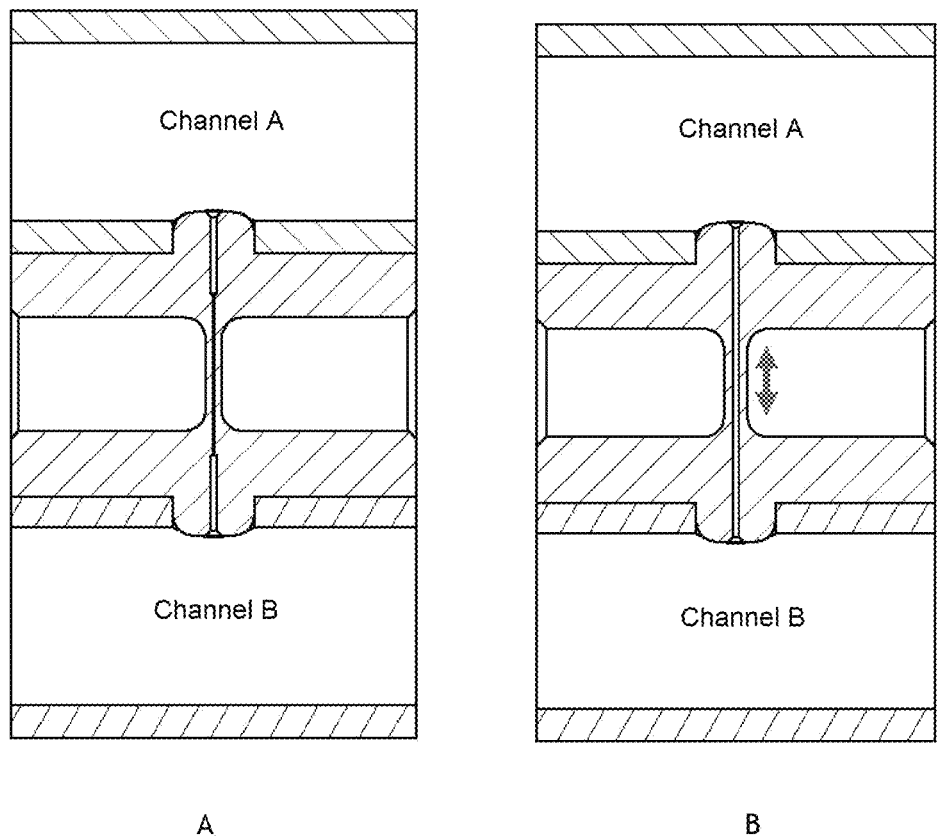

FIG. 7 represents a sectional view of the part of the device according to the invention comprising the transfer channel and comprising a pneumatic pinch valve, according to the embodiment (A1), in a closed position (A) so as to prevent the passage of material between channels A and B via the transfer channel or in an open position (B) so as to allow the passage of material between channels A and B via the transfer channel.

Figure 8:
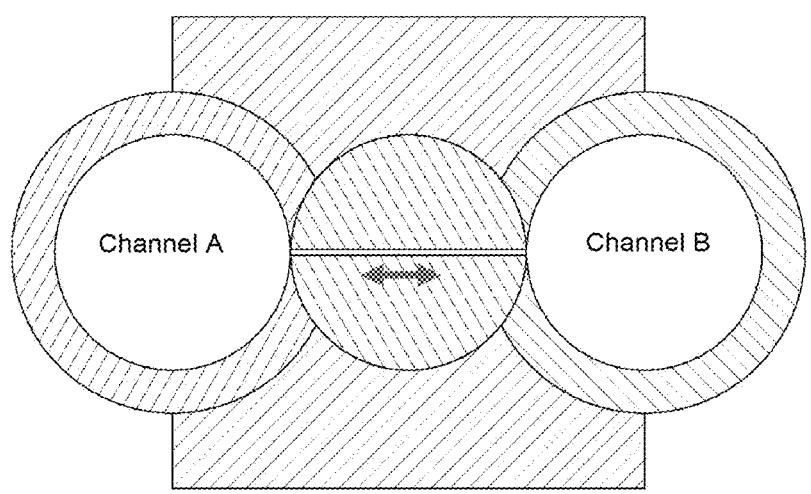

FIG. 8 represents a sectional view of the part of the device according to the invention comprising the transfer channel and comprising a cylinder valve, according to the embodiment (A1), in an open position so as to allow the passage of material between channels A and B via the transfer channel included in the inner cylinder of the cylinder valve.

Figure 9:
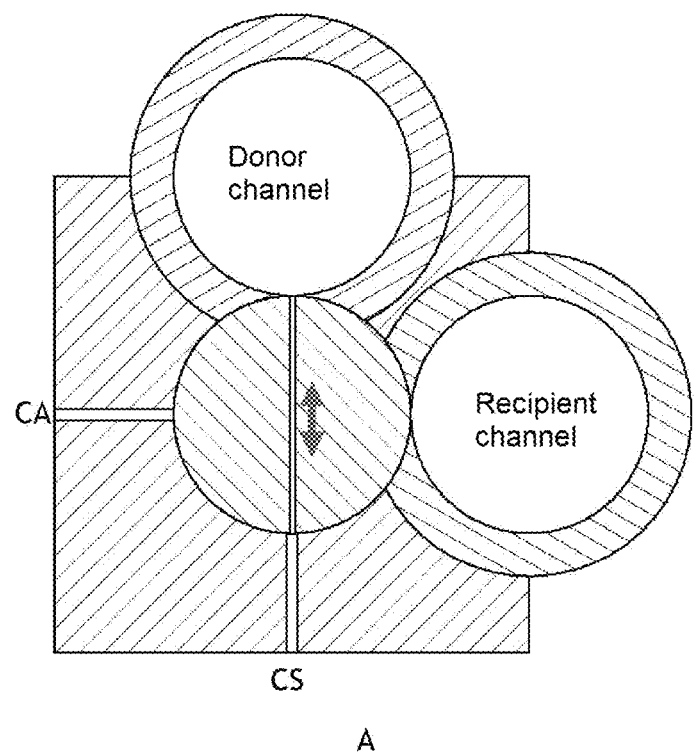
Figure 9:
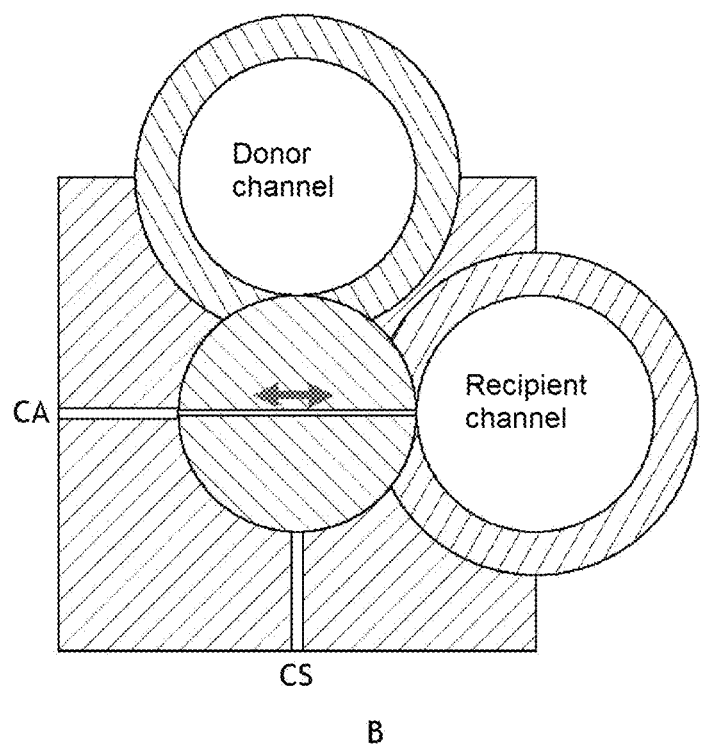

FIG. 9 represents a sectional view of the part of the device according to the invention comprising the transfer channel and comprising a cylinder valve, according to the embodiment (A3), in an open position (A) so as to allow the passage of material between the donor channel and the transfer channel and in another open position (B) so as to allow the passage of material between the recipient channel and the transfer channel, the transfer channel being comprised in the inner cylinder of the cylinder valve. CS represents the suction channel and CA represents the addition channel which are detailed below.

Figure 10:
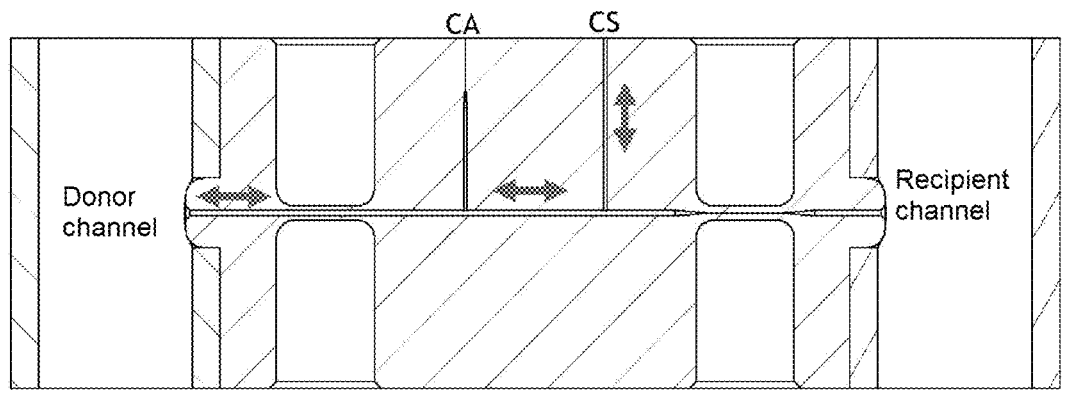
Figure 10:
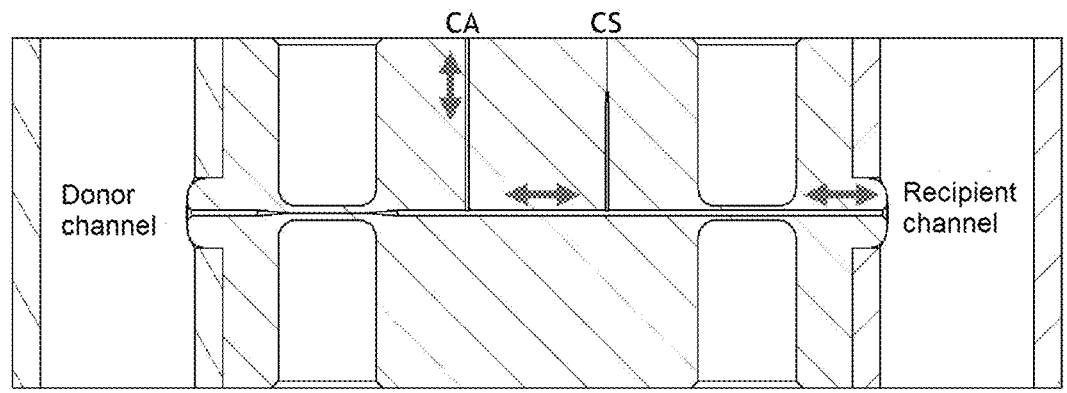

FIG. 10 represents a sectional view of the part of the device according to the invention comprising the transfer channel and comprising two pneumatic pinch valves (V1 and V2), according to the embodiment (A2), with (A) the valve V1 open and the valve V2 closed so as to allow the passage of material between the donor channel and the transfer channel and with (B) the valve V1 closed and the valve V2 open so as to allow the passage of material between the recipient channel and the transfer channel. CS represents the suction channel and CA represents the addition channel which are detailed below.

Figure 11:
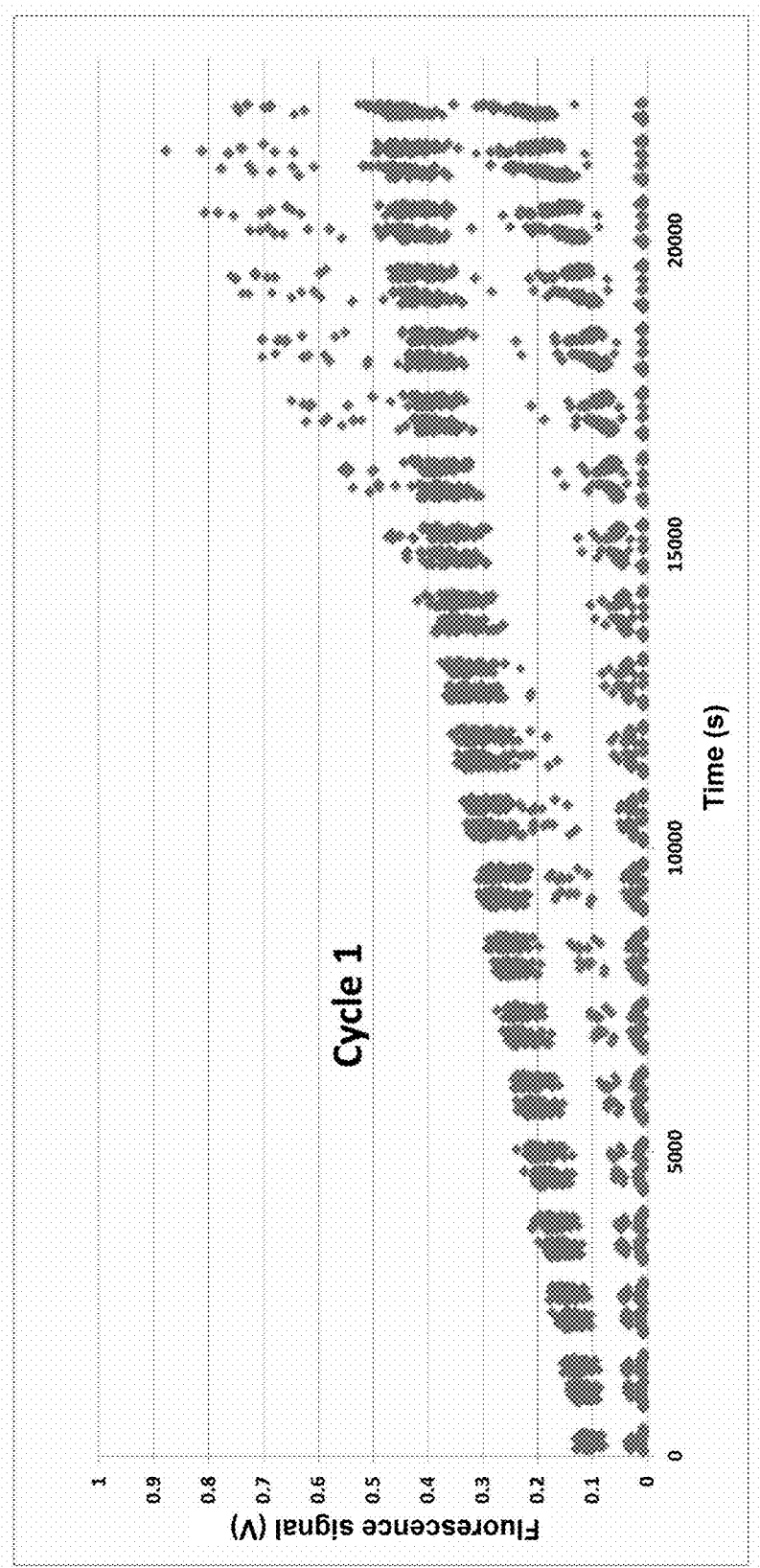

FIG. 11 represents the growth curves (fluorescence signal in volts as a function of time in seconds) of *Pseudomonas fluorescens* observed in each bioreactor during the first growth phase of example 4.

Figure 12:
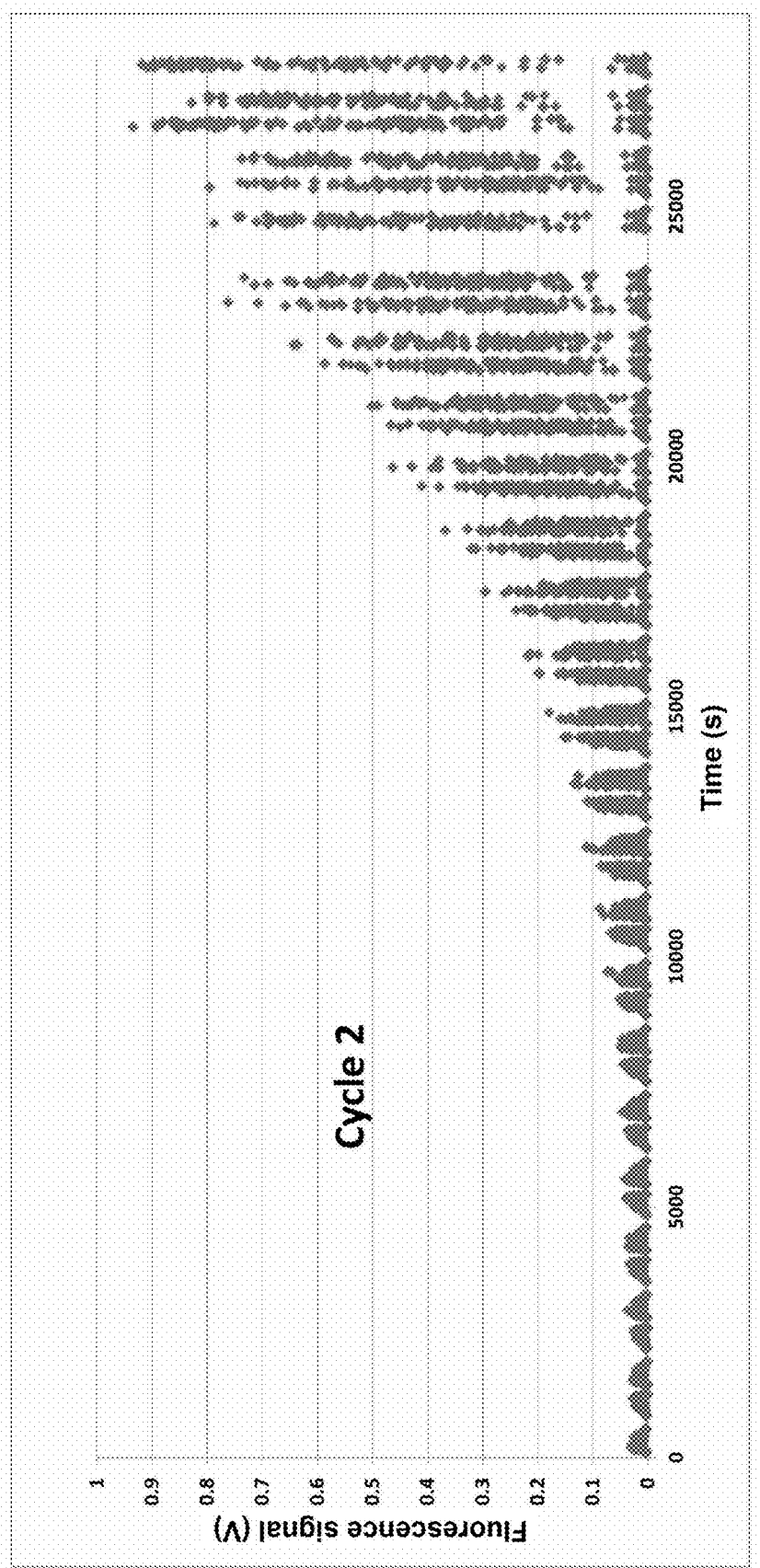

FIG. 12 represents the growth curves (fluorescence signal in volts as a function of time in seconds) of *Pseudomonas fluorescens* observed in each bioreactor during the second growth phase of example 4.

Figure 13:
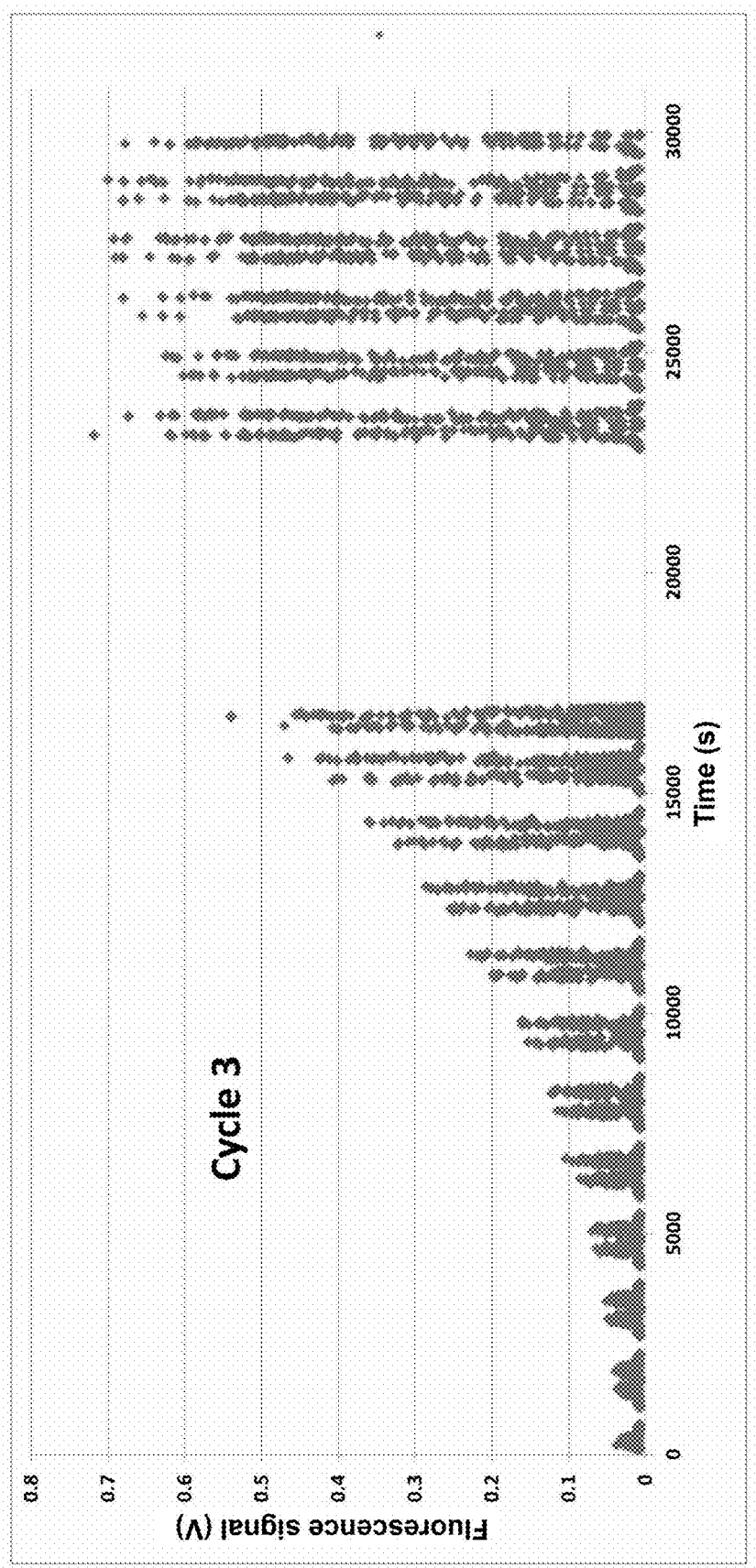

FIG. 13 represents the growth curves (fluorescence signal in volts as a function of time in seconds) of *Pseudomonas fluorescens* observed in each bioreactor during the third growth phase of example 4.

Figure 14:
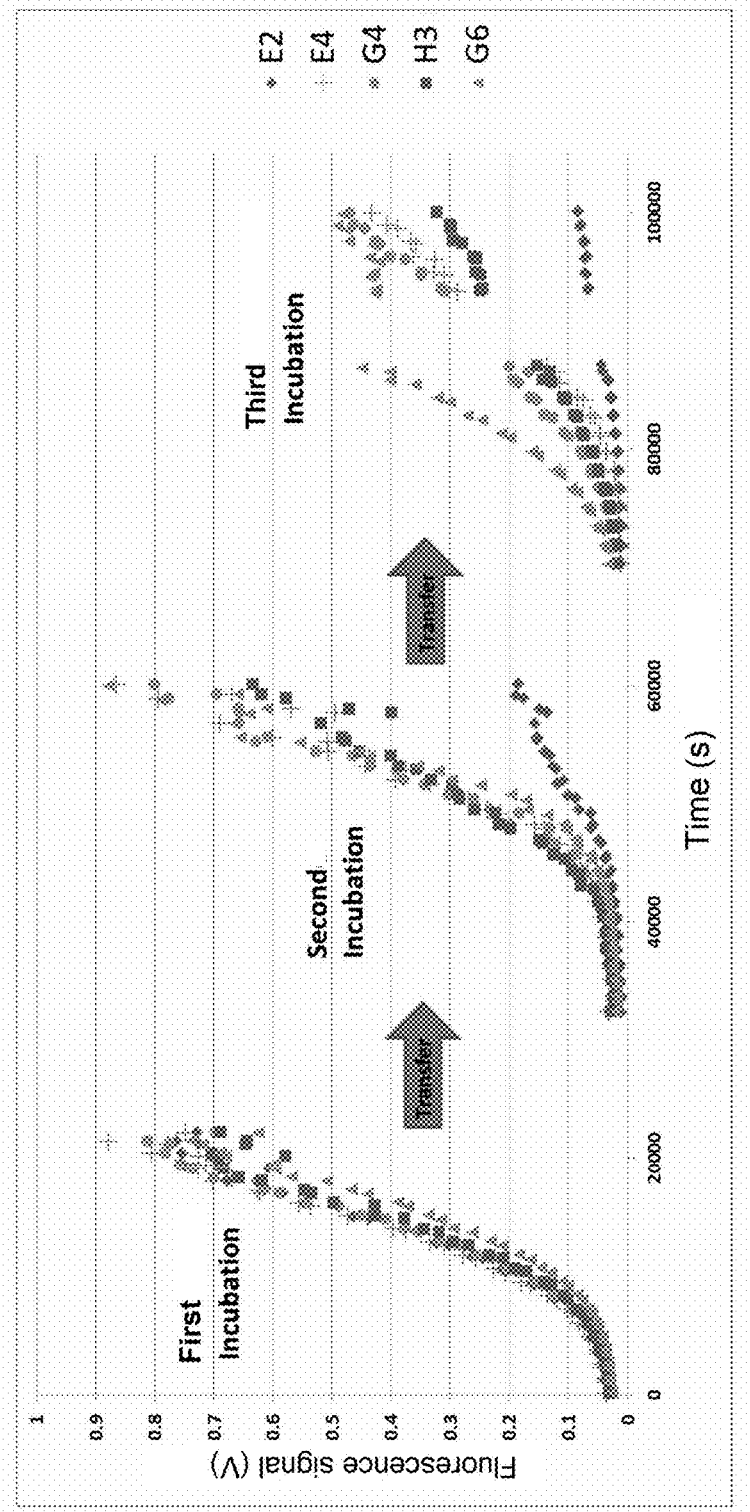

FIG. 14 represents the evolution of the growth curves of five bioreactors (derived respectively from wells E2, E4, G4, H3, G6 of the multi-well plate during the formation of the first droplet train) having an initially low dilution of bacteria ($5.10^1$ bacteria) during the three incubation phases of example 4.

DEFINITIONS

The terms "first microfluidic or millifluidic channel" and "first channel" are used interchangeably. Similarly, the terms "second microfluidic or millifluidic channel" and "second channel" are used interchangeably.

A "microfluidic" device is a device in which small volumes of fluids are handled in "microfluidic" channels/tubes, i.e., at the micrometer scale. A "millifluidic" device is a device in which small volumes of fluids are handled in "millifluidic" channels/tubes, i.e., at the millimeter scale.

In the sense of the present invention, "inner dimension" of a channel means the inner diameter of the channel in a cylindrical geometry or the inner height or width of the channel in a parallelepipedal geometry. The term "spacer" is also referred to in the art as "separator".

DETAILED DESCRIPTION

1. Method According to the Invention

Figure 3A:
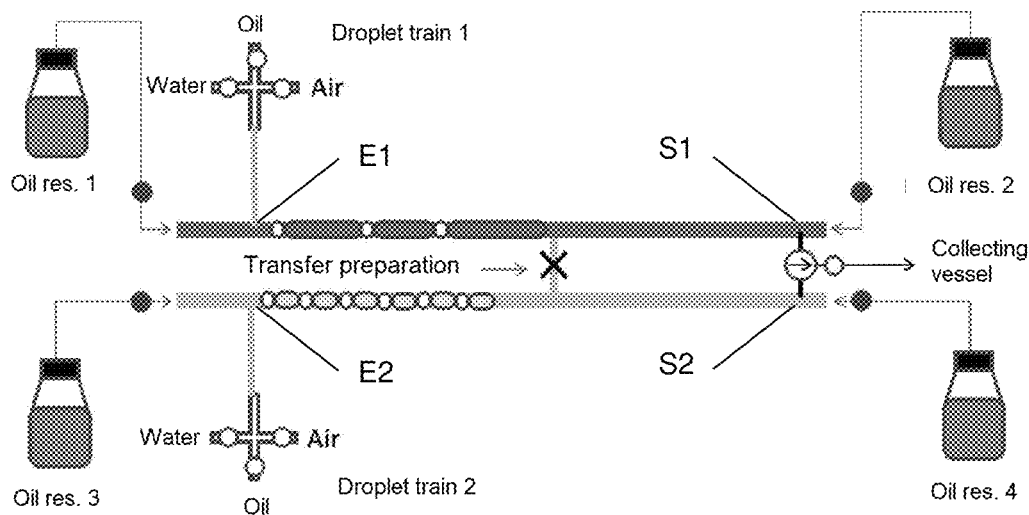
FIG. 3A represents the device of FIG. 2 in the transfer preparation phase (increase in pressure in the upper channel).
Figure 3B:
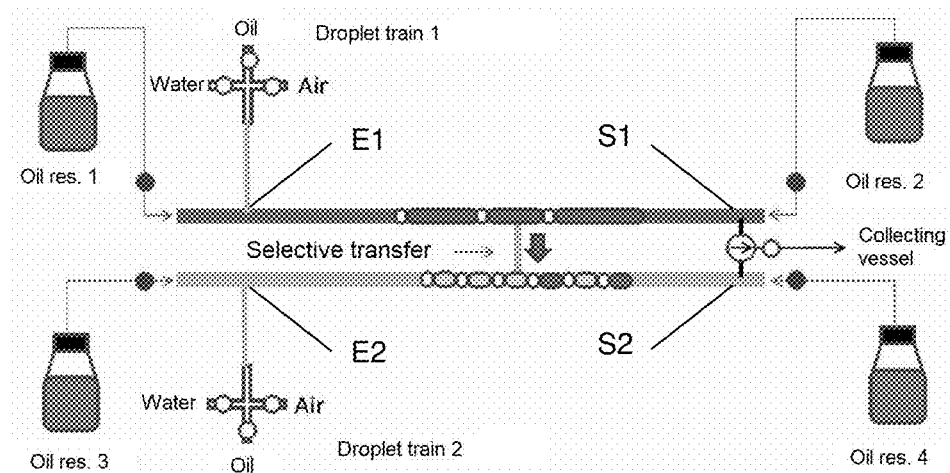
FIG. 3B represents the device of FIG. 2 in the phase of selective transfer of droplet material from the upper channel droplet train to certain droplets (darker droplets) of the lower channel droplet train.
Figure 3C:
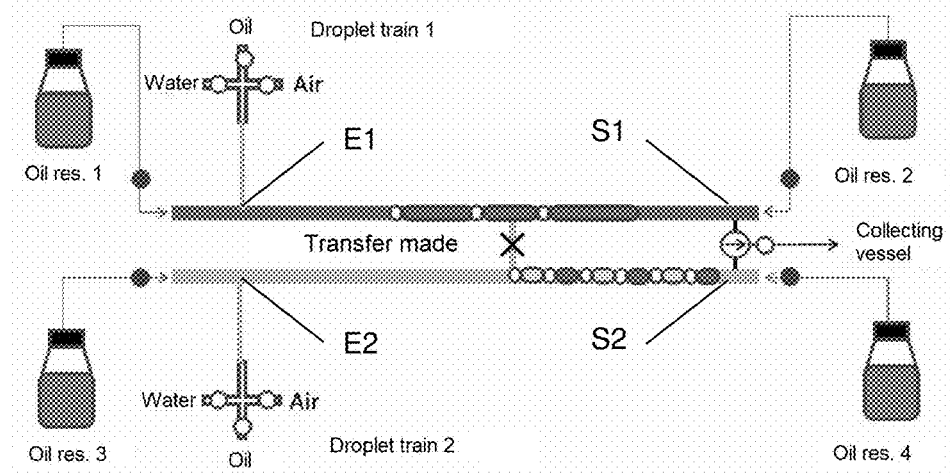
FIG. 3C represents the device of FIG. 2 once the transfer of material has been completed, the droplets from the lower channel droplet train having received droplet material from the upper channel droplet train being darker.

The method according to the invention makes it possible to transfer material from a droplet $A_n$ present in a first droplet train to another droplet Bm present in a second droplet train, or vice versa. Such a transfer operation may be repeated as many times as necessary with the same droplet $A_n$ of the first droplet train or another droplet of this first droplet train and with the same droplet Bm of the second droplet train or another droplet of this second droplet train. Such a method thus makes it possible to successively perform a large number of material transfers between two droplets of different droplet trains and to select precisely the droplets that will transmit material and the droplets that will receive this material as represented in FIGS. 3A to 3C.

The first droplet train or the second droplet train can also be removed from the device and replaced by a third droplet train to allow material transfers between droplets of the remaining first or second droplet train and droplets of the newly introduced third droplet train. Such an operation can also be repeated as many times as necessary. This makes it possible to carry out successive dilutions, for example.

The droplet train thus removed can however be stored (for example in a dedicated tube throughout the experiment or in a multi-well plate, the first option being preferred) to be reused later if necessary.

In the context of the embodiments (A2) and (A3), the first channel and the second channel can also constitute a single channel, so that the first droplet train and the second droplet train are a single droplet train. In the case in point, the material transfer is performed between two droplets of the same droplet train, for example between the droplet $A_n$ and the droplet $A_{n+k}$ (corresponding to the droplet $B_m$ above) with k≥1.

It may also be envisaged to use a microfluidic or millifluidic device comprising a third microfluidic or millifluidic channel also connected to the first channel and/or the second channel via a transfer channel. Thus, material transfers can be made between droplets of a first droplet train generated in the first channel, droplets of a second droplet train generated in the second channel and/or droplets of a third droplet train generated in the third channel. It may be envisaged to use a microfluidic or millifluidic device comprising more microfluidic or millifluidic channels if necessary, and thus additional transfer channels connecting the microfluidic or millifluidic channels in pairs, each transfer channel being associated with at least one closing and opening system to control its opening and closing (e.g. 1 or 2).

It could also be envisaged to have at least one second transfer channel between two microfluidic or millifluidic channels of the device, as for example between the first channel and the second channel. This second transfer channel should also be associated with at least one closing and opening system (e.g. 1 or 2) to control the opening and closing of this second transfer channel. It may also be envisaged to have more transfer channels between two microfluidic or millifluidic channels, each transfer channel being associated with at least one closing and opening system (e.g. 1 or 2). The presence of several transfer channels between two given microfluidic or millifluidic channels of the device makes it possible to transfer different volumes of material (e.g. due to different width/diameter between the transfer channels), to dedicate each transfer channel to the transfer of a given material, etc.

The microfluidic or millifluidic channels of the device according to the invention may be more particularly microfluidic or millifluidic tubes, such as polytetrafluoroethylene (PTFE) tubes.

According to a particular embodiment, the method according to the invention may be implemented automatically, in particular by using an automated microfluidic or millifluidic device.

In order to allow the transfer of material between a droplet $A_n$ of a first droplet train and a droplet $B_m$ of a second droplet train in the context of the embodiment (A1), these droplets should be positioned at each end of the transfer channel, i.e., at the junction between the transfer channel and the first channel and at the junction between the transfer channel and the second channel, respectively. The closing and opening system of the transfer channel is switched to the open position, so as to allow the transfer of material, via the transfer channel, between the two droplets positioned at each end of the transfer channel. The closing and opening system of the transfer channel is switched back to the closed position to complete the material transfer. Thus, the closing and opening system of the transfer channel is maintained in a closed position throughout the implementation of the method according to the invention, except at the time of carrying out a material transfer where this system is switched to the open position and allows the passage of material between the two microfluidic or millifluidic channels via the transfer channel that connects them.

In order to allow the transfer of material from the droplet $A_n$ of a first droplet train to the droplet $B_m$ of a second droplet train in the context of the embodiments (A2) and (A3), in a first phase, the droplet $A_n$ of the first droplet train should be positioned at one of the ends of the transfer channel, i.e., at the junction between the transfer channel and the first channel. The first closing and opening system of the transfer channel is switched to the open position (case of (A2)) (see FIG. 10A) or the closing and opening system of the transfer channel is switched to the first open position (case of (A3)) (see FIG. 9A), so as to allow the transfer of material of the droplet $A_n$ of the first droplet train to the transfer channel. In order to complete the transfer of material to the transfer channel, the (first) closing and opening system of the transfer channel is switched back to the closed position. In a second phase, the droplet $B_m$ of the second droplet train is positioned at the other end of the transfer channel, i.e., at the junction between the transfer channel and the second channel. The second closing and opening system of the transfer channel is switched to the open position (case of (A2)) (see FIG. 10B) or the closing and opening system of the transfer channel is switched to the second open position (case of (A3)) (see FIG. 9B), so as to allow the transfer of material from the transfer channel to the droplet $B_m$ of the second droplet train. Once the material transfer is completed, the (second) closing and opening system of the transfer channel is switched back to the closed position. In order to allow the transfer of material from the droplet $B_m$ of a second droplet train to the droplet $A_n$ of a first droplet train in the context of the embodiments (A2) and (A3), it will suffice to reverse the order of opening of the closing and opening system(s) of the transfer channel. Thus, in these embodiments, the closing and opening system(s) of the transfer channel is (are) maintained in a closed position throughout the implementation of the method according to the invention, except at the time of carrying out a material transfer which is done in two steps with (1) introduction of the material to be transferred into the transfer channel and (2) transfer of the material to be transferred from the transfer channel to the recipient droplet.

The dynamic monitoring of the droplets and of the positioning of the droplets in front of the ends of the transfer channel can be performed using a droplet detection system such as an optical system, optionally using fluorescence. This involves in particular measuring the position of the droplets, their volume and the distance between the droplets. It is also possible to control the speed of the droplet train and its relative position with respect to the transfer channel, by applying a pair of pressures at the ends of the droplet train. This control can be done manually or automatically.

Positioning a droplet in front of one end of the transfer channel to carry out a transfer of material with another droplet does not imply that the droplet is stationary. It can indeed be in motion with its droplet train as long as it remains positioned in front of the end of the transfer channel during the entire transfer period, i.e., when the transfer channel is open. This is allowed in particular by the fact that the droplets are generally not spherical but oblong in shape.

Thus different embodiments can be envisaged:
(1) the two droplets involved in the transfer are stationary;
(2) one of the droplets is stationary and the other is in motion;
(3) the two droplets involved in the transfer are in motion with the same or different speeds of movement.

The embodiment (2) can be particularly advantageous for carrying out a transfer from a "mother" droplet (which will remain stationary) to several successive "daughter" droplets of the other droplet train which can be in movement to make the different "daughter" droplets that are to receive material (for example to be diluted) follow one another rapidly.

The embodiment (3) can be used to transfer material from several "mother" droplets to one several "daughter" droplets. Thus, by not stopping the droplet trains at each transfer, the frequency of transfers is increased and, for an increasing size of droplet train, the time needed to transfer a complete droplet train is proportional to the size of the droplet train. In this embodiment, the "mother" droplet train will advantageously move faster than the "daughter" droplet train to allow material to be transferred from a large number of "mother" droplets to a small number of "daughter" droplets. If necessary, the train of "mother" droplets will be able to make several round trips.

The pressure in the different channels can be adjusted in order to direct the transfer from the "donor" channel to the "recipient" channel.

Thus, in the embodiment (A1), the pressure in the first channel and/or the second channel can be adjusted so as to direct the transfer of material from the droplet $A_n$ of the first droplet train to the droplet $B_m$ of the second droplet train or from the droplet $B_m$ of the second droplet train to the droplet $A_n$ of the first droplet train. To this end, the pressure will have to be adjusted in one or both of the two channels so as to create a pressure difference between the two channels and direct the material transfer from the channel having the higher pressure to the channel having the lower pressure. This pressure will be advantageously adjusted before the closing and opening system of the transfer channel is put in the open position. Thus:

to allow the transfer of at least a part of the droplet $A_n$ of the first droplet train to the droplet $B_m$ of the second droplet train, the pressure in the first channel (donor channel) must be higher than the pressure in the second channel (recipient channel);

to allow the transfer of at least a part of the droplet $B_m$ of the second droplet train to the droplet $A_n$ of the first droplet train, the pressure in the second channel (donor channel) must be higher than the pressure in the first channel (recipient channel).

The pressure difference imposed between the two ends of the transfer channel ensures a fixed flow of material from one channel to the other. The opening time of the transfer channel thus conditions the volume of material transferred from one droplet to the other.

Figure 1:
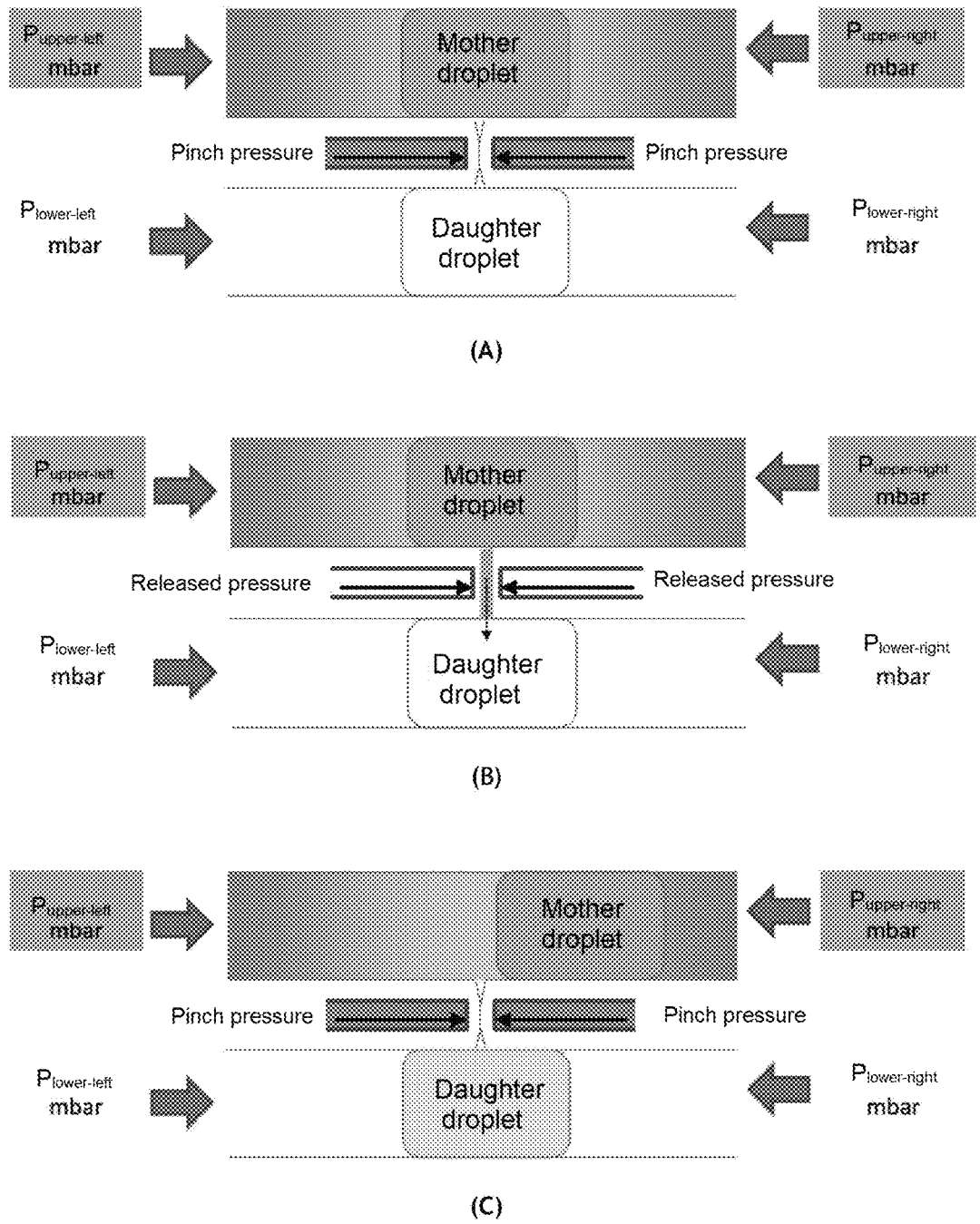

The transfer of material from a mother droplet to a daughter droplet is shown in FIG. 1, where the pressure in the upper channel is higher than that in the lower channel.

In the embodiments (A2) and (A3), the implementation of steps (f1) and (f2) allows the transfer of at least a part of the droplet $A_n$ of the first droplet train to the droplet $B_m$ of the second droplet train, the first channel being the donor channel and the second channel being the recipient channel. Conversely, the implementation of steps (f'1) and (f'2) allows the transfer of at least a part of the droplet $B_m$ of the second droplet train to the droplet $A_n$ of the first droplet train, the first channel being the recipient channel and the second channel being the donor channel.

In order to direct the transfer of material as described above, the transfer channel will be further advantageously connected to a suction channel (CS) and to an addition channel (CA) and the pressure will be adjusted in the different channels as follows:

to allow the transfer of material from the donor channel to the transfer channel (see FIG. 10A in the case of (A2) or FIG. 9A in the case of (A3)), the pressure in the donor channel and/or the suction channel will be adjusted so as to create a pressure difference between these two channels, the pressure in the donor channel having to be higher than the pressure in the suction channel;

to allow the transfer of material from the transfer channel to the recipient channel (see FIG. 10B in the case of (A2) or FIG. 9B in the case of (A3)), the pressure in the recipient channel and/or the addition channel will be adjusted so as to create a pressure difference between these two channels, the pressure in the addition channel having to be higher than the pressure in the recipient channel.

The pressure will be advantageously adjusted before the corresponding closing and opening system of the transfer channel is put in an open position. The opening time will determine the volume of material transferred.

The closing and opening system of the transfer channel comprises:
a closed position that prevents any passage of material into the transfer channel on either side of the system;
one or more open positions, more particularly one (in the case of the embodiments (A1) and (A2)) or two (in the case of the embodiment (A3)), in which the passage of material in the transfer channel, on either side of the opening point of said system, is possible.

In the context of the embodiments (A1) and (A2), the closing and opening system of the transfer channel may be any system capable of preventing any passage of material in the transfer channel, through said system, when it is in a closed position and, conversely, of allowing the passage of material in the transfer channel, through said system, when it is in an open position. Such a system comprises a single open position. It may be for example a valve used in microfluidic systems such as those described in Anthony K. Au et al., "Microvalves and Micropumps for BioMEMS", *Micromachines* 2011, 2, 179-220. It may be for example a cylinder valve (also known as a rotary valve), a translational valve, a pinch valve such as a mechanical pinch valve or pneumatic pinch valve (e.g., a Quake type valve), or a solenoid valve (also known as an electromagnetic valve or electrovalve).

The cylinder valve, also known as a rotary valve, comprises for example in this case an inner cylinder pierced by two openings, which can rotate inside an outer part comprising a cylindrical recess adjusted to the size of the inner cylinder, said part also being pierced by two openings positioned in relation to each other in the same way as the inner cylinder. When the inner cylinder and the outer part are positioned so that each opening of the inner cylinder is superimposed respectively on an opening of the outer part, the valve is in an open position and allows the passage of material (see FIG. 8). When the inner cylinder and the outer part are positioned so that their openings do not overlap, the valve is in a closed position and does not allow material to pass through. In such an embodiment, the transfer channel may be located inside the inner cylinder of the cylinder valve and connected to its two openings (see FIG. 8), or it may consist of two separate portions (for example two Teflon® tubes), each connected to one of the openings on the outer part of the cylinder valve.

In the context of the use of a translational valve, the transfer channel will also consist of two separate portions (for example two tubes) adjusted opposite each other, in an open position, so as to allow the passage of material through the transfer channel. The translational valve, for example activated by an electromagnet, will allow, when it is switched to the closed position, to translate one of the portions of the channel relative to the other so that they are no longer adjusted opposite each other and thus prevent the passage of material through the transfer channel.

A pinch valve will close the transfer channel by pinching it. In this embodiment, it is therefore advisable to use a transfer channel that can be pinched, and in particular made of a flexible material, such as a flexible polymer. The pinch can for example be mechanical or pneumatic.

In the case of a pneumatic pinch, the transfer channel can be formed in a block of PDMS (polydimethylsiloxane) which can be sufficiently compressed, by application of external pressure, to be completely closed (see FIG. 7A). Decreasing the pressure will then allow the transfer channel to be opened at the required time (see FIG. 7B). The inner surface of the PDMS transfer channel can be treated if necessary with a view to modifying the surface properties, for example by silanization. Several methods can be envisaged to apply this external pressure. According to a particular embodiment, two cavities are present on either side of the transfer channel, ideally located at about the mid-point of the transfer channel. The channel will thus be sandwiched between these two cavities. By increasing the pressure in these two cavities, for example to 1 bar, the transfer channel can be compressed. To this end, the distance between each cavity of the transfer channel must not be too great to allow this compression, for example 50 to 150 µm, in particular 50 to 100 µm, such as about 80 µm.

A solenoid valve (also known as an electromagnetic valve or electrovalve) is an electrically controlled valve that can be used in an automated device.

Advantageously, the closing and opening system of the transfer channel will be a pinch valve, especially a pneumatic pinch valve.

In the context of the embodiment (A3), the closing and opening system of the transfer channel comprises two open positions, i.e., it comprises two separate transfer channel opening points that can be opened independently of each other. It may be any system capable of preventing the passage of material in the transfer channel, through said system, when it is in a closed position (i.e., the two opening points of the transfer channel are closed) and, conversely, allowing the passage of material in the transfer channel only through the opening point that is open.

More particularly, it will be a cylinder valve, also called a rotary valve. Contrary to the cylinder valves of the embodiments (A1) and (A2), such a valve will comprise for example an inner cylinder pierced by two openings that can rotate inside an outer part comprising a cylindrical recess adjusted to the size of the inner cylinder, said part being pierced by four openings. When the inner cylinder and the outer part are positioned so that their openings do not overlap, the valve is in a closed position and does not allow the passage of material. When the inner cylinder and the outer part are positioned so that the two openings of the inner cylinder overlap respectively with two openings of the outer part, the valve is in one of these open positions (see FIG. 9). In such an embodiment, the transfer channel is ideally located inside the inner cylinder of the cylinder valve and connects its two openings (see FIG. 9).

A droplet train comprises, in particular consists of, a continuous phase, at least two droplets and optionally at least one spacer between two successive droplets. The spacers are intended to avoid the fusion of the droplets together. When a spacer is not present because the droplets do not tend to fuse together, the droplets are separated from each other by the continuous phase. Advantageously, a droplet train comprises, in particular consists of, a continuous phase, at least two droplets and at least one spacer between two successive droplets.

The continuous phase prevents the droplets and spacers from wetting the channel wall by surrounding them with a thin film of continuous phase. This facilitates the movement of the droplet train in the channel by forming a lubricating film between the droplets/optional spacers and the channel wall.

In order to be able to form a droplet train, the continuous phase must be substantially immiscible with the droplet phase and the phase of the spacer(s), when present, must be substantially immiscible with the continuous phase and with the droplet phase.

The continuous phase could be a mineral or fluorinated oil, for example a fluorinated oil.

The phase constituting the droplets will advantageously comprise an aqueous solution, i.e., comprising water as the main fluid.

The phase constituting the optional spacer(s) could be a gas such as air; or a liquid immiscible with the continuous phase and the phase constituting the droplets to be spaced, such as a mineral oil or silicone oil. Preferably, the spacer phase is a gas such as air.

The formation of a droplet train in a microfluidic or millifluidic channel is well known to the person skilled in the art. Any method capable of forming a droplet train may be used in the context of the present invention.

According to a first embodiment, the droplet train is generated using a junction called "T" junction. In this embodiment, a carrier fluid (the continuous phase) circulates in a main channel at constant speed. A secondary channel is connected to the main channel substantially perpendicularly so as to form a "T" junction. A second fluid (intended to constitute the droplets), immiscible with the carrier fluid, flows in this secondary channel towards the "T" junction formed between the two channels. By adjusting the flow rate of each of the fluids, the carrier fluid will split the second fluid so as to form homogeneous droplets. In order to add a spacer between each droplet, a second secondary channel is connected to the main channel substantially perpendicularly so as to form a second "T" junction downstream of the first "T" junction. A third fluid (intended to constitute the spacers), immiscible with the carrier fluid and the second fluid, flows through this second secondary channel towards the second "T" junction. By adjusting the flow rate of each of the fluids, the carrier fluid will split the third fluid so as to form spacers between two droplets. This method makes it possible to have droplets of the same composition or with a composition gradient for example.

Figure 2:
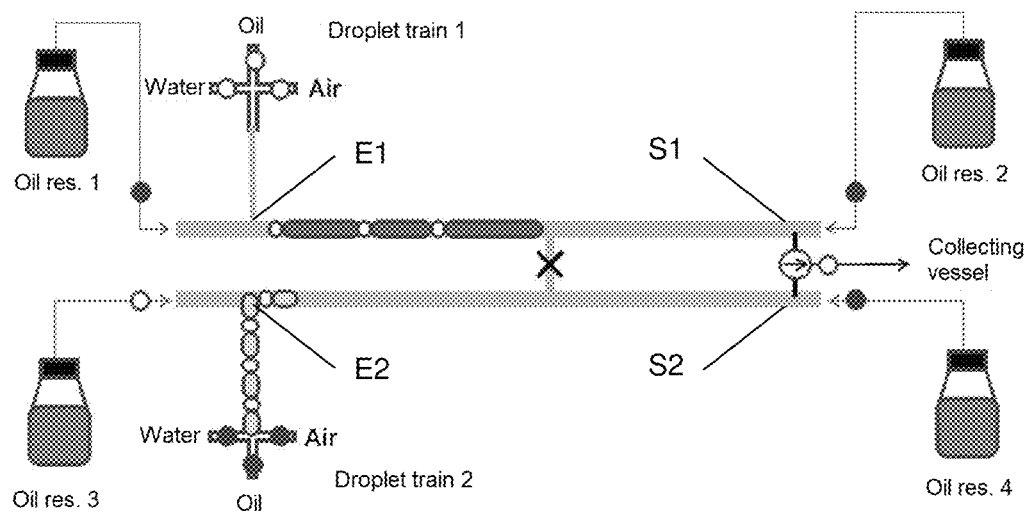

According to a second embodiment, the droplet train is generated using a junction called "X" junction. This embodiment is similar to the above embodiment with two "T" junctions. In this case, the two secondary channels face each other so as to form an "X" junction with the main channel. Spacers are therefore necessarily present. The fluids of the droplets and the spacers split at the "X" junction in phase opposition. It is no longer the carrier fluid that causes the splitting of the immiscible fluids into droplets/spacers, but these two immiscible fluids that are thus coupled at the junction. Such a system for generating droplet trains is shown in FIG. 2 with the oil corresponding to the continuous phase, the water corresponding to the phase intended to form the droplets and the air corresponding to the phase intended to form the spacers. The formation of spacers of compressible fluid (for example gas such as air) at the "X" junction is conditioned by the hydraulic pressure at this junction. This pressure may fluctuate as the droplet train is generated.

According to a third embodiment, to prime the process, the droplet train is generated by continuously drawing up a fluid at the end of a tube which will either be immersed in a reservoir containing an aqueous solution intended to form the droplets on the surface of which is a film of carrier fluid, or held in the air to form an air spacer. Several reservoirs of different aqueous solutions can be used to form droplets of different compositions. The reservoirs can for example consist of a well of a multi-well plate. In this case, the droplet train is generated by successively drawing up the contents of each well. Each droplet will then be constituted by the contents of one well.

The method according to the present invention may more particularly be implemented using a microfluidic or millifluidic device as described in paragraph 2 below.

2. Device for Carrying Out the Method According to the Invention

The present invention also relates to a microfluidic or millifluidic, preferably millifluidic, device which can be used to implement the method according to the invention, comprising:
a first microfluidic or millifluidic channel comprising an inlet E1 and an outlet S1;
a second microfluidic or millifluidic channel comprising an inlet E2 and an outlet S2;
a transfer channel connecting the first microfluidic or millifluidic channel to the second microfluidic or millifluidic channel;
a closing and opening system to control the opening and closing of the transfer channel;
a droplet train generation system connected to both the inlet E1 of the first channel and the inlet E2 of the second channel or two droplet train generation systems connected to the inlet E1 of the first channel and the inlet E2 of the second channel respectively;
a system for controlling pressure in the first microfluidic or millifluidic channel and in the second microfluidic or millifluidic channel.

Thus, the microfluidic or millifluidic device according to the present invention comprises a first microfluidic or millifluidic channel and at least one second microfluidic or millifluidic channel. It may further comprise at least one third microfluidic or millifluidic channel. One or more other microfluidic or millifluidic channels may also be present if necessary.

These microfluidic or millifluidic channels are intended to contain and allow the circulation of droplet trains, as mentioned above. These channels can have for example a cylindrical (for example tube) or parallelepipedal geometry. Advantageously, the microfluidic channels will have a parallelepipedal geometry while the millifluidic channels will have a cylindrical geometry. According to a particular embodiment, the channels will have a cylindrical (for example tube) geometry, and can be more particularly tubes, for example made of PTFE.

Advantageously, the inner dimension D of each microfluidic or millifluidic channel will independently be comprised between 10 µm and 3 mm, in particular comprised between 500 µm and 2.5 mm, advantageously comprised between 1.5 mm and 2.2 mm. Thus:
if the first channel has an inner dimension $D_1$, where $D_1$ represents the inner diameter of the first channel in a cylindrical geometry or the inner height or width of the first channel in a parallelepipedal geometry; and if the second channel has an inner dimension $D_2$, where $D_2$ represents the inner diameter of the second channel in a cylindrical geometry or the inner height or width of the second channel in a parallelepipedal geometry; $D_1$ and $D_2$ will independently be comprised between 10 µm and 3 mm, in particular comprised between 500 µm and 2.5 mm, advantageously comprised between 1.5 mm and 2.2 mm.

Indeed, when the inner dimension of the channel, in particular its inner diameter, is greater than 3 mm, the effects of gravity can destabilize the droplet train (for example spreading of the droplet train, fusion and splitting of droplets).

The microfluidic or millifluidic device according to the present invention comprises at least one transfer channel connecting the first microfluidic or millifluidic channel to the second microfluidic or millifluidic channel. One or more other transfer channels, in particular at least one second transfer channel, may connect the first microfluidic or millifluidic channel to the second microfluidic or millifluidic channel. Similarly, if the device according to the invention comprises more than two microfluidic or millifluidic channels, one or more transfer channels may connect the microfluidic or millifluidic channels in pairs.

Each transfer channel will be equipped with at least one closing and opening system of said transfer channel, for example one or two. Such a closing and opening system may be as defined above.

The transfer channel has an inner dimension d, where d represents more specifically the inner diameter of the transfer channel in a cylindrical geometry or the inner height or width of the transfer channel in a parallelepipedal geometry. The transfer channel will advantageously have a cylindrical geometry. This inner dimension will in particular be less than or equal to each inner dimension D of the microfluidic or millifluidic channels that it connects. More particularly, the ratio d/D will be comprised between 0.001 and 1, in particular comprised between 0.01 and 0.2, advantageously comprised between 0.02 and 0.1. Thus, for the transfer channel of inner dimension d connecting the first microfluidic or millifluidic channel to the second microfluidic or millifluidic channel having respectively inner dimensions $D_1$ and $D_2$, the inner dimension D representing the smallest value between $D_1$ and $D_2$ will be taken into account and the ratio d/D will be advantageously comprised between 0.001 and 1, in particular comprised between 0.01 and 0.2, advantageously comprised between 0.02 and 0.1. The transfer channel may have for example an inner dimension d comprised between 50 and 100 µm.

The device according to the invention may comprise a single droplet train generation system connected to each of the inlets of the first channel, the second channel and any other microfluidic or millifluidic channel present in the device. The device may further comprise several droplet train generation systems, and in particular as many droplet train generation systems as there are microfluidic or millifluidic channels present in the device, each droplet train generation system then being connected to the inlet of a microfluidic or millifluidic channel.

The droplet train generation system can be any system used in the art to form a droplet train. It could be for example a system comprising one or two "T" junctions or an "X" junction as described above.

The device according to the invention further comprises a system for controlling the pressure in the first microfluidic or millifluidic channel and in the second microfluidic or millifluidic channel, and optionally in any other microfluidic or millifluidic channel present in the device. This system for controlling the pressure is used to set the droplet train in motion but also to adjust the pressure in the channels to allow transfers of material.

The microfluidic or millifluidic device according to the present invention may also comprise one or more reservoirs and one or more collecting vessels.

The device may comprise in particular at least one reservoir intended to contain a continuous phase and in particular four reservoirs intended to contain a continuous phase connected respectively to the inlet E1 and the outlet S1 of the first channel and to the inlet E2 and the outlet S2 of the second channel. Thus, each inlet or outlet of each microfluidic or millifluidic channel present in the device will be connected to a reservoir intended to contain a continuous phase. Such reservoirs intended to contain a continuous phase are shown in FIG. 2 (Oil res. 1, 2, 3 and 4).

The device may also comprise one or more collecting vessels connected to the outlets of the microfluidic or millifluidic channels present in the device. Preferably, the device will comprise as many collecting vessels as there are microfluidic or millifluidic channels present in the device. Thus, each outlet of each microfluidic or millifluidic channel present in the device will be connected to a collecting vessel.

According to a particular embodiment, the device according to the invention comprises:
four reservoirs designed to contain a continuous phase connected respectively to the inlet E1 and the outlet S1 of the first channel and to the inlet E2 and the outlet S2 of the second channel; and
two collecting vessels connected respectively to the outlet S1 of the first channel and the outlet S2 of the second channel.

The device may also comprise one or more reservoirs intended to contain the phase(s) that will constitute the droplets of the droplet trains. Where one or more spacers are present, the device may further comprise one or more reservoirs intended to contain the phase that will constitute the spacer(s) of the droplet trains. This or these reservoir(s) intended to contain the phase(s) that will constitute the droplets and the phase that will constitute the spacer(s), as well as one or more reservoir(s) intended to contain a continuous phase may be connected to the droplet train generation system(s).

According to a particular embodiment, the device according to the invention will be a millifluidic device. Indeed, the use of such a scale has a number of advantages.

The increase in the inner dimension of the channels decreases their hydraulic resistance and therefore the pressure difference necessary to set a droplet train in motion.

The spacers have a longer life span and a droplet train can therefore be incubated without coalescence for longer periods of time.

The local hydraulic pressure in the train is more homogeneous and the temporal fluctuation of the spacer volume is therefore lower.

The droplet trains are more stable at constant flow rate and longer droplet trains can be handled.

The flow rate can be increased without destabilizing the droplet train in order to increase the frequency of material transfers.

The larger the inner dimension of the channels, the faster the droplet train reacts to a change in pressure, i.e., a pressure wave propagates better and is less dissipated the lower the resistance of the channels to flow.

More voluminous droplets can be handled, their minimum size being of the same order of magnitude as the diameter of the channel so that they can be confined. This is closer to the standard volumes used in microbiology. Since the transfer channel necessarily has a minimum transfer volume, increasing the droplet size increases the range of possible dilution ratios.

3. Use of the Method According to the Invention

The method according to the invention makes it possible to transfer a sample of any selected droplet of one droplet train to any other selected droplet of another droplet train (or the same droplet train). It thus makes it possible to carry out precisely the two elementary pipetting operations (taking and adding) allowing all the usual sample handling operations in the laboratory.

The droplets of the droplet trains can therefore have two distinct roles: a role of microreactor or a role of reservoir for chemical/biological reagents constituting a source of raw material for microreactor type droplets.

The method according to the present invention may thus be used for the preparation of biological or chemical samples, the carrying out of biological or chemical reactions, the screening of molecules of synthetic or biological origin, or the screening or culture of microorganisms such as bacteria.

Indeed, the transfer operations carried out in the context of the method according to the present invention may allow the preparation of chemical or biological samples by diluting in each "daughter" droplet of the material derived from one or more "mother" droplets constituting the original droplet train [steps of initiation or conditioning of an experiment], as well as linking two steps of a chemical (kinetic, reaction sequence) or biological sequence (chemostat, selection, oscillating conditions) [transmission steps].

Furthermore, the method according to the present invention makes it possible to test a number of different conditions and is for this reason clearly suitable for the implementation of screening. For example, from an automatically generated homogeneous droplet train, we will be able to transfer the desired chemical compounds from the droplets of the second droplet train, as well as biological samples from the droplets of a third droplet train. By analyzing their growths, it will be possible to distinguish the responses of the different cultures to the different conditions tested and thus to screen them.

The present invention is illustrated by the non-limiting examples below.

EXAMPLES

1. Structure and Manufacture of a Transfer Block

Structure: the transfer block is here a parallelepipedal, optically transparent, block containing two large cylindrical and parallel cavities that hold the tubes carrying the droplet trains. In the center of the block, the two cylindrical cavities are connected by a narrow channel. In addition, the narrow channel (transfer channel) can be closed/re-opened by application of pneumatic pressure. This transfer block is represented schematically in FIG. 4A. A photograph of this transfer block is represented in FIG. 4B.

Manufacture: To prepare a transfer block with such a structure, a solution of polydimethylsiloxane (PDMS) and curing agent is cast into a mold with an appropriate design.
Mold Construction:
1. Two wide fluoropolymer tubes are arranged.
2. These tubes are pierced by a small hole on their surface in the middle.
3. These two tubes are positioned horizontally and parallel to each other so that their holes face each other. The angle between the radius of a tube passing through one of these holes and the vertical is 45°. The tubes are spaced 3 mm apart
4. A small piece of wire (75 µm diameter) is positioned through the two tubes, with the ends of the wire penetrating the holes formed on the surface of both tubes.
5. The wire is held in position with glue introduced through the various tube openings (ends like the central hole).
6. At the center of the wire, two cylindrical wire cables (1.4 mm diameter) are positioned there on each side, parallel and equidistant from the two tubes, so that the ends of both cables frame. A small distance of about 80 µm is maintained between the wire and the flat ends of the cables on each side.
This finalizes the design of the mold.
Manufacture of the Transfer Block from the Mold:
7. To fill this mold, mild (with a 10:0.2 ratio of curing agent to PDMS) and strong (with a 10:1.75 ratio of curing agent to PDMS) polymerization solutions are prepared.
8. First, the mild polymerization solution is applied around the wire and the ends of the cables that surround it, and crosslinked at 65° C. for 2 h.
9. Second, the mold is completely filled with the strong polymerization solution and crosslinked overnight.
10. Finally, after the polymer has fully crosslinked, the two large tubes, the wire and the cables are gently removed from the solidified element to obtain a transfer block for a two-tube system.

2. Example of a Device According to the Invention

An example of a device according to the invention comprises the elements detailed below (the main elements of this device are schematized in FIG. 2).

Fluidic system: Two long independent tubes (each 10 m long and 2.2 mm inner diameter) are wound and arranged in parallel with each other, with their ends connected to four independently pressure-controlled oil reservoirs to impose a flow of liquid in both tubes in both directions.

Fluid control: Solenoid valves are added between the oil reservoirs and the ends of the tubes to regulate the flow of fluids.

Droplet train: Droplet trains are created in both tubes, using a millifluidic X junction where an aqueous phase, an air phase and an oil phase are introduced through three of its three ports, and which generate a droplet train in the fourth port connected to a tube. In a droplet train, the water and air phases are alternately dispersed in the continuous oil phase.

Transfer block: To allow fluid transfer between the two parallel tubes, a small hole (800 µm dia) is pierced in the surface of both tubes. The tubes are then inserted into the large parallel holes of the transfer block so that the two holes in the tubes are aligned with the two ends of the transfer channel to establish fluid communication between the two tubes. In addition, two tubes are connected to the two holes on the sides of the transfer block to pinch the transfer channel by the application of pneumatic pressure.

Optical system: Individual droplet identification is required to allow selection of the targeted droplets for transfer through the transfer channel. To enable this, a continuous image of the transfer block is analyzed using a monochrome camera, a uniform light source and a mirror. A real-time image analysis technique is developed to identify the droplets individually. In addition, fluorescent detectors can be mounted on both tubes to read and record the growth of fluorescent bacteria.

Droplet identification: Two different techniques can be used for the identification of droplets: (1) by detection line or (2) by shape recognition.
(1) Detection line: In this technique, the refraction of water droplets on the side of the tube is used to detect its presence. In practice, the gray level of a mono-pixel line is evaluated according to the side of the tube. Low gray levels thus indicate the presence of a droplet (FIG. 5A).
This signal can be digitized by removing all gray level values that do not correspond to a water droplet (FIG. 5B). The movement of the droplets can be followed by comparing the successive images (FIGS. 5B and 5C).
(2) Shape recognition: This technique is suitable for tubes fully covered with PDMS in the transfer block and comprises two steps:
1. Identification of all the objects scattered by their contour;
2. Comparison of a vertical section of the identified objects to a reference section corresponding to that of a droplet to detect water droplets.

3. Implementation of a Material Transfer by a Method According to the Invention The device of Example 2 was used to transfer material from a droplet of a first droplet train to a droplet of a second droplet train according to the following steps:
1. The droplets are positioned and stopped (maintaining a pressure gradient between the two tubes).

The target droplets are brought to each end of the transfer channel by applying pressure in one direction (from the left in FIG. 6). The target droplet is stopped by applying counter pressure (from the right) adjusted in accordance with the position of the droplet relative to the transfer channel.

2. Once the donor and recipient droplets are positioned, the transfer channel is opened by releasing the pressure applied to it.
3. The transfer is stopped by closing the transfer channel by reapplying pressure.

FIG. 6 represents such a transfer of material from a donor droplet (droplet no. 7 in the lower tube—"donor tube") to a recipient droplet (droplet no. 6 in the upper tube—"recipient tube"), the droplets being identified by shape recognition. It presents chronological photographs of the area of the device around the transfer channel corresponding to the following phases:
1. Closed transfer channel, donor and recipient droplets placed in position at each end of the transfer channel;
2. Open transfer channel;
3. Material flow from the donor droplet into the transfer channel which is partially filled;
4. Continuation of the flow: the transfer channel is filled but the recipient droplet is not yet in contact with the flow;
5. Addition of the flow material into the recipient droplet;
6. Transfer complete: the transfer channel will be closed.

4. Incubation by Serial Transfer of Bacterial Cultures 160 cultures of *Pseudomonas fluorescens* were maintained in the growth phase at 28° C. for 3 days as detailed below, using the device shown in example 2, and applying the transfer protocol of example 3 using the transfer module of example 1 during transfers of material from one droplet train to another.

These bacteria were selected for this example because they are fluorescent (YFP—Yellow Fluorescent Protein) and their growth can be followed during the experiment by measuring the fluorescence emission received by a photomultiplier.

In the context of this experiment, a first droplet train (30 μL bioreactors) was initially generated from a 384-well culture plate with each well containing either milli-Q® water (mQ water), or a culture medium (aqueous solution of M9×5 at 11.28 g/L, casamino acid at 1 g/L, magnesium sulfate at 0.24 g/L, glucose at 3.6 g/L and IPTG at 0.24 g/L) containing bacteria in one of the following three concentration ranges: near saturation with $5 \cdot 10^6$ bacteria/droplet; low dilution with $5 \cdot 10^5$ bacteria/droplet; high dilution with $<10^3$ bacteria/droplet. This first droplet train was generated from the culture plate and is composed of 16 droplets of mQ water, then 160 droplets containing bacteria, then 16 droplets of mQ water.

This first droplet train was incubated for 6 h by keeping it in constant motion in the incubation tube and measuring the YFP fluorescence signal of these droplets at each passage. FIG. 11 shows the growth curves observed during this phase. After this first 6 h growth phase, a second droplet train (consisting of 16 water droplets, then 160 droplets of the same sterile culture medium, and 16 water droplets, each droplet being separated from the others by an air bubble of 10 μL and fluorinated oil) was generated and 1 μL of each droplet of the first droplet train was transferred using the transfer module described in example 1 into a droplet of the second droplet train, then the first droplet train was removed.

This second droplet train was incubated under the same conditions as the previous train for 8 h. FIG. 12 shows the growth curves observed during this phase. After this second 8 h growth phase, a third droplet train was generated in the same manner as the second droplet train and 1 μL of each droplet of the second droplet train was transferred using the same transfer module to a droplet of the third droplet train, then the second droplet train was removed.

This second droplet train was incubated under the same conditions as the previous train for 8 h. FIG. 13 shows the growth curves observed during this third growth phase.

FIG. 4 schematizes this example and shows the evolution of the growth curves of five bioreactors (derived respectively from wells E2, E4, G4, H3, G6 of the multi-well plate during the formation of the first droplet train) having a low dilution of bacteria initially ($5 \cdot 10^5$ bacteria) during the three successive incubation phases. This example clearly illustrates that the method according to the invention allows bacterial culture.

The invention claimed is:
1. A method for transferring material between two droplets in a microfluidic or millifluidic device comprising:
    a first microfluidic or millifluidic channel,
    a second microfluidic or millifluidic channel,
    a transfer channel connecting the first microfluidic or millifluidic channel to the second microfluidic or millifluidic channel, wherein the transfer channel joins the first microfluidic or millifluidic channel at a first junction between the transfer channel and the first microfluidic or millifluidic channel, and wherein the transfer channel joins the second microfluidic or millifluidic channel at a second junction between the transfer channel and the second microfluidic or millifluidic channel, and
    a closing and opening system to control opening and closing of the transfer channel, wherein the closing and opening system comprises an open position and a closed position, wherein the open position allows the passage of material directly between the droplets $A_n$ and $B_m$ via the transfer channel, wherein the closed position prevents any passage of material into the transfer channel,
    wherein the method comprises:
    (a) if the closing and opening system is not in the closed position, putting the closing and opening system of the transfer channel in the closed position;
    (b) generating, in the first microfluidic or millifluidic channel, a first droplet train comprising a continuous phase, at least two droplets and optionally at least one spacer between two successive droplets ($A_n$) and ($A_{n+1}$) where $n \geq 1$;
    (c) generating, in the second microfluidic or millifluidic channel, a second droplet train comprising a continuous phase, at least two droplets and optionally at least one spacer between two successive droplets ($B_m$) and ($B_{m+1}$) where $m \geq 1$;
    (d) positioning a droplet ($A_n$) of the first droplet train before the first junction between the transfer channel and the first microfluidic or millifluidic channel;

(e) positioning a droplet ($B_m$) of the second droplet train before the second junction between the transfer channel and the second microfluidic or millifluidic channel;

(f) transferring at least a part of the droplet ($A_n$) of the first droplet train to the droplet ($B_m$) of the second droplet train, or
transferring at least a part of the droplet ($B_m$) of the second droplet train to the droplet ($A_n$) of the first droplet train; and (g) optionally repeating each of steps (d) to (f) one or more times with the same droplet ($A_n$) or a different droplet of the first droplet train and with the same droplet ($B_m$) or a different droplet of the second droplet train,
wherein step (f) is carried out after steps (d) and (e) and comprises:
putting the closing and opening system of the transfer channel in the open position,
transferring at least a part of the droplet ($A_n$) of the first droplet train to the droplet ($B_m$) of the second droplet train, or
transferring at least a part of the droplet ($B_m$) of the second droplet train to the droplet ($A_n$) of the first droplet train, and then
putting the closing and opening system of the transfer channel back in the closed position.

2. The method according to claim 1, wherein the first microfluidic or millifluidic channel has a first pressure and the second microfluidic or millifluidic channel has a second pressure,
wherein step (f) further comprises adjusting the first pressure and/or the second pressure, wherein
when step (f) comprises transferring at least a part of the droplet ($A_n$) of the first droplet train to the droplet ($B_m$) of the second droplet train, the first pressure and/or the second pressure is adjusted in a manner that the second pressure is higher than the first pressure; or
when step (f) comprises transferring at least a part of the droplet ($B_m$) of the second droplet train to the droplet ($A_n$) of the first droplet train, the first pressure and/or the second pressure is adjusted in a manner that the second pressure is higher than the first pressure.

3. The method according to claim 1, wherein the closing and opening system of the transfer channel is a cylinder valve, a translational valve, a pinch valve, or a solenoid valve.

4. The method according to claim 1, wherein the continuous phase of the first droplet train and the second droplet train is a mineral or fluorinated oil;
wherein the droplets of the first droplet train and the second droplet train are constituted by a droplet phase comprising an aqueous solution;
wherein the optional at least one spacer of the first droplet train are constituted by a spacer phase being a gas or a liquid immiscible with the continuous phase of the first droplet train and the droplet phase constituting the droplets of the first droplet train,
wherein the optional at least one spacer of the second droplet train are constituted by a spacer phase being a gas or a liquid immiscible with the continuous phase of the second droplet train and the droplet phase constituting the droplets of the second droplet train.

5. The method according to claim 1, wherein
the first microfluidic or millifluidic channel has an inner dimension $D_1$,
wherein the first microfluidic or millifluidic has a cylindrical geometry or a parallelepipedal geometry,
wherein, when the first microfluidic or millifluidic channel has the cylindrical geometry, the first microfluidic or millifluidic channel has an inner diameter and $D_1$ represents the inner diameter of the first microfluidic or millifluidic channel,
wherein, when the first microfluidic or millifluidic channel has the parallelepipedal geometry, the first microfluidic or millifluidic channel has an inner height or width and $D_1$ represents the inner height or width of the first microfluidic or millifluidic channel;
wherein the second microfluidic or millifluidic channel has an inner dimension $D_2$,
wherein the second microfluidic or millifluidic has a second cylindrical geometry or a second parallelepipedal geometry,
wherein, when the second microfluidic or millifluidic channel has the cylindrical geometry, the second microfluidic or millifluidic channel has an inner diameter and $D_2$ represents the inner diameter of the second microfluidic or millifluidic channel, and
wherein, when the second microfluidic or millifluidic channel has the parallelepipedal geometry, the second microfluidic or millifluidic channel has an inner height or width and $D_2$ represents the inner height or width of the second microfluidic or millifluidic channel; and
wherein $D_1$ and $D_2$ are independently from 10 μm to 3 mm.

6. The method according to claim 5, wherein the transfer channel has an inner dimension d,
wherein the transfer channel has a cylindrical geometry or a parallelepipedal geometry,
wherein, when the transfer channel has the cylindrical geometry, the transfer channel has an inner diameter and d represents the inner diameter, and
wherein, when the transfer channel has the parallelepipedal geometry, the transfer channel has an inner height or width and d represents the inner height or width;
wherein D represents the smallest value between $D_1$ and $D_2$; and
wherein the ratio d/D is from 0.001 to 1.

7. The method according to claim 1, further comprising:
(h) removing the first droplet train from the first microfluidic or millifluidic channel;
(i) generating, in the first microfluidic or millifluidic channel in step (h), a third droplet train comprising a continuous phase, at least two droplets and optionally at least one spacer between two successive droplets ($C_p$) and ($C_{p+1}$) where $p \geq 1$;
(j) implementing steps (d) to (g), wherein in steps (d) to (g), the third droplet train is used in place of the first droplet train removed in step (h);
(k) optionally repeating each of steps (h) to (j) one or more times;
or further comprising:
(h') removing the second droplet train from the second microfluidic or millifluidic channel;
(i') generating, in the second microfluidic or millifluidic channel in step (h'), a third droplet train comprising a continuous phase, at least two droplets and optionally at least one spacer between two successive droplets ($C_p$) and ($C_{p+1}$) where $p \geq 1$;
(j') implementing steps (d) to (g), wherein in steps (d) to (g), the third droplet train is used in place of the second droplet train removed in step (h');
(k') optionally repeating each of steps (h') to (j') one or more times.

8. The method according to claim 3, wherein the closing and opening system of the transfer channel is a pinch valve wherein the pinch valve is a mechanical pinch valve or a pneumatic pinch valve.

9. The method according to claim 4, wherein the gas is air; and the liquid immiscible with the continuous phase and the droplet phase is a mineral oil or a silicone oil.

10. The method according to claim 6, wherein $D_1$ and $D_2$ are independently from 1.5 mm to 2.2 mm and the ratio d/D is from 0.02 to 0.1.

11. A method for transferring material between two droplets in a microfluidic or millifluidic device comprising:
a first microfluidic or millifluidic channel,
a second microfluidic or millifluidic channel,
a transfer channel connecting the first microfluidic or millifluidic channel to the second microfluidic or millifluidic channel, wherein the transfer channel joins the first microfluidic or millifluidic channel at a first junction between the transfer channel and the first microfluidic or millifluidic channel, and wherein the transfer channel joins the second microfluidic or millifluidic channel at a second junction between the transfer channel and the second microfluidic or millifluidic channel, and
a closing and opening system to control opening and closing of the transfer channel, wherein the closing and opening system of the transfer channel comprises a first open position, a second open position, and a closed position, or the closing and opening system of the transfer channel comprises a first closing and opening system and a second closing and opening system, wherein the first closing and opening system comprises a first open position and a first closed position and the second closing and opening system comprises a second open position and a second closed position, wherein the first closing and opening system is closer to the junction of the transfer channel to the first microfluidic or millifluidic channel than the second closing and opening system, and the second closing and opening system is closer to the junction of the transfer channel to the second microfluidic or millifluidic channel than the first closing and opening system,
wherein the first open position allows the transfer of material from the first microfluidic or millifluidic channel to the transfer channel or, conversely, from the transfer channel to the first microfluidic or millifluidic channel; and the second open position allows the transfer of material from the second microfluidic or millifluidic channel to the transfer channel or, conversely, from the transfer channel to the second microfluidic or millifluidic channel; the closed position prevents any passage of material into the transfer channel on either side of the closing and opening system; the first closed position prevents the transfer of material between the first microfluidic or millifluidic channel and the transfer channel; and the second closed position prevents the transfer of material between the second microfluidic or millifluidic channel and the transfer channel,
wherein the method comprises:
(a) when the closing and opening system of the transfer channel comprises a first open position, a second open position, and a closed position, putting the closing and opening system of the transfer channel in the closed position if the closing and opening system is not in the closed position, or
when the closing and opening system of the transfer channel comprises a first closing and opening system and a second closing and opening system, putting the first closing and opening system in the first closed position if the first closing and opening system is not in the first closed position, and putting the second closing and opening system in the second closed position if the second closing and opening system is not in the second closed position;
(b) generating, in the first microfluidic or millifluidic channel, a first droplet train comprising a continuous phase, at least two droplets and optionally at least one spacer between two successive droplets $(A_n)$ and $(A_{n+1})$ where n≥1;
(c) generating, in the second microfluidic or millifluidic channel, a second droplet train comprising a continuous phase, at least two droplets and optionally at least one spacer between two successive droplets $(B_m)$ and $(B_{m+1})$ where m≥1;
(d) positioning a droplet $(A_n)$ of the first droplet train before the first junction between the transfer channel and the first microfluidic or millifluidic channel;
(e) positioning a droplet $(B_m)$ of the second droplet train before the second junction between the transfer channel and the second microfluidic or millifluidic channel;
(f) transferring at least a part of the droplet $(A_n)$ of the first droplet train to the droplet $(B_m)$ of the second droplet train, or
transferring at least a part of the droplet $(B_m)$ of the second droplet train to the droplet $(A_n)$ of the first droplet train; and
(g) optionally repeating each of steps (d) to (f) one or more times with the same droplet $(A_n)$ or a different droplet of the first droplet train and with the same droplet $(B_m)$ or a different droplet of the second droplet train,
wherein step (f) comprises successive sub-steps (f1) and (f2), or (f'1) and (f'2), or (f3) and (f4), or (f'3) and (f'4),
wherein:
sub-step (f1) is implemented after step (d) and comprises putting the first closing and opening system of the transfer channel in the first open position and transferring at least a part of the droplet $(A_n)$ of the first droplet train to the transfer channel, and then putting the first closing and opening system of the transfer channel back in the first closed position; and
sub-step (f2) is implemented after step (e) and comprises putting the second closing and opening system of the transfer channel in the second open position and transferring the material from the droplet $(A_n)$ of the first droplet train present in the transfer channel to the droplet $(B_m)$ of the second droplet train, and then putting the second closing and opening system of the transfer channel back in the second closed position;
sub-step (f'1) is implemented after step (e) and comprises putting the second closing and opening system of the transfer channel in the second open position and transferring at least a part of the droplet $(B_m)$ of the second droplet train to the transfer channel, and then putting the second closing and opening system of the transfer channel back in the second closed position; and
sub-step (f'2) is implemented after step (d) and comprises putting the first closing and opening system of the transfer channel in the first open position and transferring the material from the droplet ($B_m$) of the second droplet train which is present in the transfer channel to the droplet ($A_n$) of the first droplet train, and then putting the first closing and opening system of the transfer channel back in the first closed position;

sub-step (f3) is implemented after step (d) and comprises putting the closing and opening system of the transfer channel in the first open position and transferring at least a part of the droplet ($A_n$) of the first droplet train to the transfer channel, and then putting the closing and opening system of the transfer channel back in the closed position; and sub-step (f4) is implemented after step (e) and comprises putting the closing and opening system of the transfer channel in the second open position and transferring the material from the droplet ($A_n$) of the first droplet train present in the transfer channel to the droplet ($B_m$) of the second droplet train, and then putting the closing and opening system of the transfer channel back in the closed position;

sub-step (f3) is implemented after step (e) and comprises putting the closing and opening system of the transfer channel in the second open position and transferring at least a part of the droplet ($B_m$) of the second droplet train to the transfer channel, and then putting the closing and opening system of the transfer channel back in the closed position; and sub-step (f4) is implemented after step (d) and comprises putting the closing and opening system of the transfer channel in the first open position and transferring the material from the droplet ($B_m$) of the second droplet train which is present in the transfer channel to the droplet ($A_n$) of the first droplet train, and then putting the closing and opening system of the transfer channel back in the closed position.

12. The method according to claim 11, wherein the first microfluidic or millifluidic channel has a first pressure and the second microfluidic or millifluidic channel has a second pressure,
wherein step (f) further comprises adjusting the first pressure and/or the second pressure, wherein
when step (f) comprises transferring at least a part of the droplet ($A_n$) of the first droplet train to the droplet ($B_m$) of the second droplet train, the first pressure and/or the second pressure is adjusted in a manner that the second pressure is higher than the first pressure; or
when step (f) comprises transferring at least a part of the droplet ($B_m$) of the second droplet train to the droplet ($A_n$) of the first droplet train, the first pressure and/or the second pressure is adjusted in a manner that the second pressure is higher than the first pressure.

13. The method according to claim 11, wherein step (f) comprises the sub-steps (f1) and (f2), or (f3) and (f4),
wherein the transfer channel is further connected to a suction channel and to an addition channel,
wherein the first microfluidic or millifluidic channel has a first pressure, the second microfluidic or millifluidic channel has a second pressure, the suction channel has a third pressure, and the addition channel has a fourth pressure,
wherein
sub-steps (f1) and (f3) further comprise adjusting the first pressure and/or the third pressure in a manner that, the first pressure is higher than the third pressure; and then sub-steps (f2) and (f4) further comprise adjusting the second pressure and/or the fourth pressure in a manner that, the fourth pressure is higher than the second pressure.

14. The method according to claim 11, wherein step (f) comprises the sub-steps (f1) and (f2), or (f3) and (f4),
wherein the transfer channel is further connected to a suction channel and to an addition channel,
wherein the first microfluidic or millifluidic channel has a first pressure, the second microfluidic or millifluidic channel has a second pressure, the suction channel has a third pressure, and the addition channel has a fourth pressure,
wherein:
sub-steps (f1) and (f3) further comprise adjusting the second pressure and/or the third pressure in a manner that the second pressure is higher than the third pressure; and then
sub-steps (f2) and (f4) further comprise adjusting the first pressure and/or the fourth pressure in a manner that the fourth pressure is higher than the first pressure.

15. The method according to claim 11, wherein the microfluidic or millifluidic device further comprises a droplet detection system.

16. The method according to claim 11, wherein the closing and opening system of the transfer channel is a cylinder valve, a translational valve, a pinch valve, or a solenoid valve.

17. The method according to claim 16, wherein the closing and opening system of the transfer channel is a pinch valve wherein the pinch valve is a mechanical pinch valve or a pneumatic pinch valve.

18. The method according to claim 11, wherein the continuous phase of the first droplet train and the second droplet train is a mineral or fluorinated oil;
wherein the droplets of the first droplet train and the second droplet train are constituted by a droplet phase comprising an aqueous solution;
wherein the optional at least one spacer of the first droplet train are constituted by a spacer phase being a gas or a liquid immiscible with the continuous phase of the first droplet train and the droplet phase constituting the droplets of the first droplet train,
wherein the optional at least one spacer of the second droplet train are constituted by a spacer phase being a gas or a liquid immiscible with the continuous phase of the second droplet train and the droplet phase constituting the droplets of the second droplet train.

19. The method according to claim 18, wherein the gas is air; and the liquid immiscible with the continuous phase and the droplet phase is a mineral oil or a silicone oil.

20. The method according to claim 11, wherein
the first microfluidic or millifluidic channel has an inner dimension $D_1$,
wherein the first microfluidic or millifluidic has a cylindrical geometry or a parallelepipedal geometry,
wherein, when the first microfluidic or millifluidic channel has the cylindrical geometry, the first microfluidic or millifluidic channel has an inner diameter and $D_1$ represents the inner diameter of the first microfluidic or millifluidic channel,
wherein, when the first microfluidic or millifluidic channel has the parallelepipedal geometry, the first microfluidic or millifluidic channel has an inner height or width and $D_1$ represents the inner height or width of the first microfluidic or millifluidic channel;

wherein the second microfluidic or millifluidic channel has an inner dimension $D_2$, wherein the second microfluidic or millifluidic has a second cylindrical geometry or a second parallelepipedal geometry, wherein, when the second microfluidic or millifluidic channel has the cylindrical geometry, the second microfluidic or millifluidic channel has an inner diameter and $D_2$ represents the inner diameter of the second microfluidic or millifluidic channel, and wherein, when the second microfluidic or millifluidic channel has the parallelepipedal geometry, the second microfluidic or millifluidic channel has an inner height or width and $D_2$ represents the inner height or width of the second microfluidic or millifluidic channel; and wherein $D_1$ and $D_2$ are independently from 10 μm to 3 mm.

21. The method according to claim 20, wherein the transfer channel has an inner dimension d, wherein the transfer channel has a cylindrical geometry or a parallelepipedal geometry, wherein, when the transfer channel has the cylindrical geometry, the transfer channel has an inner diameter and d represents the inner diameter, and wherein, when the transfer channel has the parallelepipedal geometry, the transfer channel has an inner height or width and d represents the inner height or width;

wherein D represents the smallest value between $D_1$ and $D_2$; and wherein the ratio d/D is from 0.001 to 1.

22. The method according to claim 21, wherein D; and D2 are independently from 1.5 mm to 2.2 mm and the ratio d/D is from 0.02 to 0.1.

23. The method according to claim 11, further comprising:

(h) removing the first droplet train from the first microfluidic or millifluidic channel;

(i) generating, in the first microfluidic or millifluidic channel in step (h), a third droplet train comprising a continuous phase, at least two droplets and optionally at least one spacer between two successive droplets $(C_p)$ and $(C_{p+1})$ where p≥1;

(j) implementing steps (d) to (g), wherein in steps (d) to (g), the third droplet train is used in place of the first droplet train removed in step (h);

(k) optionally repeating each of steps (h) to U) one or more times;

or further comprising the following steps:

(h') removing the second droplet train from the second microfluidic or millifluidic channel;

(i') generating, in the second microfluidic or millifluidic channel in step (h'), a third droplet train comprising a continuous phase, at least two droplets and optionally at least one spacer between two successive droplets $(C_p)$ and $(C_{p+1})$ where p≥1;

(j') implementing steps (d) to (g), wherein in steps (d) to (g), the third droplet train is used in place of the second droplet train removed in step (h');

(k') optionally repeating each of steps (h') to (j') one or more times.

* * * * *